(12) United States Patent
Borrowman et al.

(10) Patent No.: US 11,673,166 B2
(45) Date of Patent: Jun. 13, 2023

(54) SEED IMAGING

(71) Applicant: Monsanto Technology LLC, St. Louis, MO (US)

(72) Inventors: Eric L. Borrowman, St. Peters, MO (US); Govind Chaudhary, Maryland Heights, MO (US); Hsin-Chen Chen, Manchester, MO (US); Jeffrey L. Kohne, Kirkwood, MO (US); Johnny J. Kotyk, Manchester, MO (US); Louis M. Pompe van Meerdevoort, Rotterdam (NL); Randall K. Rader, St. Charles, MO (US); Brad D. White, Creve Coeur, MO (US); Chi Zhang, Chesterfield, MO (US)

(73) Assignee: Monsanto Technology LLC, St. Louis, MO (US)

(*) Notice: Subject to any disclaimer, the term of this patent is extended or adjusted under 35 U.S.C. 154(b) by 659 days.

(21) Appl. No.: 16/352,484

(22) Filed: Mar. 13, 2019

(65) Prior Publication Data

US 2019/0281781 A1 Sep. 19, 2019

Related U.S. Application Data

(60) Provisional application No. 62/642,684, filed on Mar. 14, 2018.

(51) Int. Cl.
*B07C 5/34* (2006.01)
*B07C 5/342* (2006.01)
(Continued)

(52) U.S. Cl.
CPC .......... *B07C 5/3425* (2013.01); *A01C 1/025* (2013.01); *G01N 15/1475* (2013.01);
(Continued)

(58) Field of Classification Search
CPC .............. G01N 21/85; G01N 21/6428; G01N 2021/8592; G01N 33/025; G01N 21/6456;
(Continued)

(56) References Cited

U.S. PATENT DOCUMENTS 2,849,619 A 8/1958 Eisfeldt
3,177,360 A 4/1965 Hague, Jr. et al.
(Continued)

FOREIGN PATENT DOCUMENTS

CN 103347381 A 10/2013
CN 101341815 B1 * 6/2014
(Continued)

OTHER PUBLICATIONS

International Search Report and Written Opinion for PCT/US2019/22065 dated Mar. 13, 2019, 10 pages, United States.
(Continued)

*Primary Examiner* — Michael P Stafira
(74) *Attorney, Agent, or Firm* — Harness, Dickey & Pierce, P.L.C.

(57) ABSTRACT

A seed imaging system for imaging seeds includes a seed transfer station configured to move seeds through the system. An imaging assembly includes a first camera mounted relative to the seed transfer station and configured to acquire images of the seeds as the seeds move through the system. A second camera is mounted relative to the seed transfer station and is configured to acquire images of the seeds as the seeds move through the system. The second camera has an imaging modality different from an imaging modality of the first camera. First and second cameras may be disposed above and below the seed transfer stations, such as a transparent belt.

21 Claims, 13 Drawing Sheets

(51) Int. Cl.
  *G01N 21/84* (2006.01)
  *A01C 1/02* (2006.01)
  *G01N 15/14* (2006.01)

(52) U.S. Cl.
  CPC ....... *G01N 21/84* (2013.01); *G01N 2015/149* (2013.01); *G01N 2015/1445* (2013.01); *G01N 2015/1493* (2013.01); *G01N 2015/1497* (2013.01)

(58) Field of Classification Search
  CPC ....... G01N 2201/129; G01N 2015/149; G01N 21/3563; G01N 21/359; G01N 1/04; G01N 2021/0339; G01N 2021/8466; G01N 21/253; G01N 21/6452; G01N 2201/0627; G01N 1/28; G01N 1/286; G01N 2015/1497; G01N 15/1459; G01N 15/1463; G01N 2015/0019; G01N 24/08; G01N 21/94; G01N 21/31; G01N 33/5097; G01N 33/0098; G01N 1/06; G01N 21/5907; G01N 2201/0221; G01N 35/0099; G01N 35/04; G01N 2035/0496; G01N 21/6486; G01N 33/582; G01N 1/20; G01N 2001/002; G01N 2015/1472; G01N 2021/6417; G01N 2035/00188; G01N 21/274; G01N 21/4738; G01N 21/55; G01N 21/64; G01N 21/84; G01N 21/8806; G01N 21/8851; G01N 33/48; G01N 33/52; G01N 35/00584; G01N 35/02; G01N 35/025; G01N 15/147; G01N 15/1475; G01N 2021/1765; G01N 2021/8564; G01N 21/17; G01N 21/65; G01N 2201/062; G01N 2223/03; G01N 2223/1016; G01N 2223/401; G01N 2223/421; G01N 2223/635; G01N 23/04; G01N 33/03; G01N 33/10; G01N 1/08; G01N 15/0255; G01N 2001/021; G01N 2001/2873; G01N 2001/4088; G01N 21/25; G01N 21/251; G01N 21/27; G01N 21/88; G01N 21/9508; G01N 2291/023; G01N 29/04; G01N 29/44; G01N 29/46; G01N 35/00029; G01N 2033/245; G01N 33/24; G01N 33/246; G01N 21/3554; G01N 2021/1793; G01N 2021/3155; G01N 2201/0616; G01N 27/333; G01N 1/4044; G01N 2001/2866; G01N 2001/4061; G01N 2021/4742; G01N 2033/243; G01N 21/474; G01N 27/043; G01N 27/223; G01N 21/89; G01N 15/00; G01N 15/0227; G01N 2015/1445; G01N 2015/1493; G01N 33/5008; G01N 33/5088; G01N 33/533; G01N 33/566; G01N 33/92; G01N 1/02; G01N 1/10; G01N 2001/085; G01N 2021/8455; G01N 2021/8883; G01N 21/01; G01N 21/95; G01N 2201/1296; G01N 2223/616; G01N 33/188; G01N 15/0826; G01N 2021/0112; G01N 2021/4735; G01N 2021/8887; G01N 21/33; G01N 21/6458; G01N 21/658; G01N 23/083; G01N 23/12; G01N 33/4833; G01N 33/50; G01N 2291/015; G01N 2291/0427; G01N 2291/106; G01N 2291/2695; G01N 2291/2698; G01N 29/0654; G01N 29/27; G01N 2203/0048; G01N 2203/0075; G01N 1/36; G01N 2001/366; G01N 2203/0003; G01N 2203/0017; G01N 2203/0019; G01N 2203/0232; G01N 2203/0272; G01N 2203/0274; G01N 2203/0641; G01N 2203/0647; G01N 3/06; G01N 3/068; G01N 3/10; G01N 3/28; G01N 2223/646; B07C 5/3425; B07C 2501/009; B07C 5/34; B07C 5/02; B07C 5/3422; B07C 5/342; B07C 5/36; B07C 5/362; B07C 5/00; B07C 5/10; B07C 5/3427; B07C 2501/0081; B07C 5/38; B07C 2501/0018; B07C 5/361; B07C 5/365; B07C 5/3416; B07C 5/367; B07C 5/04; B07C 5/368; B07C 5/363; B07C 5/366; B07C 2501/0036; B07C 2501/0054; B07C 2501/0063; B07C 3/06; B07C 3/18; B07C 5/08; B07C 5/3412; B07C 7/04; B07C 5/12; A01C 1/00; A01C 1/025; A01C 21/005; A01C 7/04; A01C 7/20; A01C 1/042; A01C 5/064; A01C 7/06; A01C 21/007; A01C 7/002; A01C 7/08; A01C 7/124; A01C 7/128; A01C 7/18; A01C 21/00; A01C 1/02; A01C 11/02; A01C 11/025; A01C 1/04; A01C 14/00; A01C 7/102; A01C 1/005; A01C 1/06; A01C 23/002; A01C 23/04; A01C 23/042; A01C 5/066; A01C 5/08; A01C 7/00; A01C 7/02; A01C 7/042; A01C 7/044; A01C 7/048; A01C 7/163; A01C 5/068; A01C 7/105; A01C 7/203; A01C 7/205; A01C 23/025; A01C 7/046; A01C 7/081; A01C 5/06; A01C 7/006; A01C 1/08; A01C 7/201; A01C 2001/048; A01C 7/16; A01C 23/007; A01C 5/04; A01C 7/10; A01C 7/206; A01C 23/00; A01C 23/023; A01C 23/047; A01C 7/107; A01C 1/044; A01C 11/006; A01C 21/002; A01C 23/02; A01C 7/12; A01C 9/02; A01C 23/021; A01C 7/085; A01C 7/087; A01C 19/02; A01C 7/127; A01B 79/005; A01B 79/02; A01B 49/06; A01B 76/00; A01B 69/008; A01B 61/00; A01B 61/04; A01B 63/111; A01B 63/16; A01B 69/004; A01B 69/00; A01B 69/001; A01B 69/003; A01B 27/005; A01B 63/008; A01B 47/00; A01B 49/00; A01B 63/1112; A01B 77/00; A01B 49/027; A01B 49/04; A01B 49/065; A01B 51/02; A01B 63/32; A01B 41/00
  See application file for complete search history.

(56) References Cited

U.S. PATENT DOCUMENTS

| | | |
|---|---|---|
| 3,488,495 A | 1/1970 | Schneeman |
| 3,768,645 A | 10/1973 | Conway et al. |
| 3,928,753 A | 12/1975 | Kivett et al. |
| 4,273,649 A | 6/1981 | Leverett |
| 4,357,535 A | 11/1982 | Haas |
| 4,809,308 A | 2/1989 | Adams et al. |
| 4,922,092 A | 5/1990 | Rushbrooke et al. |
| 5,113,425 A | 5/1992 | Zweig |
| 5,289,921 A | 3/1994 | Rodrigo et al. |
| RE35,423 E | 1/1997 | Adams et al. |
| 5,865,299 A | 2/1999 | Williams |
| 5,973,286 A | 10/1999 | Wan |
| 6,145,650 A | 11/2000 | Christ et al. |
| 6,427,128 B1 | 7/2002 | Satake et al. |

(56) References Cited

U.S. PATENT DOCUMENTS

| | | | |
|---|---|---|---|
| 6,646,264 B1 | 11/2003 | Modiano et al. | |
| 7,082,185 B2 | 7/2006 | Freifeld et al. | |
| 7,105,813 B2 | 9/2006 | Lee | |
| 7,529,338 B2 | 5/2009 | Fung et al. | |
| 7,742,564 B2 | 6/2010 | Parham et al. | |
| 7,816,616 B2 | 10/2010 | Kenny et al. | |
| 8,189,901 B2 | 5/2012 | Modiano et al. | |
| 8,452,445 B2 | 5/2013 | Becker et al. | |
| 8,488,863 B2 | 7/2013 | Boucheron | |
| 9,157,855 B2 | 10/2015 | Tin et al. | |
| 9,188,553 B2 | 11/2015 | Sakuta et al. | |
| 9,492,130 B2 | 11/2016 | Flagle et al. | |
| 9,545,724 B2 | 1/2017 | Bonora et al. | |
| 9,865,424 B2 | 1/2018 | Ikeda et al. | |
| 10,078,093 B2 | 9/2018 | Flagle et al. | |
| 10,207,296 B2 | 2/2019 | Garcia et al. | |
| 10,345,479 B2 | 7/2019 | Langeveld et al. | |
| 10,512,942 B2 | 12/2019 | Tandon | |
| 10,557,805 B2 | 2/2020 | Chaudhary et al. | |
| 10,830,711 B2 | 11/2020 | Kondo | |
| 11,020,066 B2 | 6/2021 | Butani et al. | |
| 11,044,843 B2 | 6/2021 | Kotyk et al. | |
| 11,083,426 B2 | 8/2021 | Defreitas et al. | |
| 11,116,184 B2 | 9/2021 | Goméz et al. | |
| 2001/0022830 A1 | 9/2001 | Sommer et al. | |
| 2003/0112440 A1 | 6/2003 | Fukumori et al. | |
| 2003/0188998 A1 | 10/2003 | Depperman | |
| 2004/0218716 A1 | 11/2004 | Freifeld et al. | |
| 2005/0056777 A1 | 3/2005 | Lee | |
| 2005/0226465 A1* | 10/2005 | Fujita | G06T 7/0004 382/110 |
| 2006/0176642 A1 | 8/2006 | George et al. | |
| 2007/0012604 A1 | 1/2007 | Basford | |
| 2007/0291896 A1 | 12/2007 | Parham et al. | |
| 2008/0308472 A1 | 12/2008 | Osiensky et al. | |
| 2008/0310674 A1* | 12/2008 | Modiano | G01N 21/85 382/100 |
| 2010/0143906 A1* | 6/2010 | Becker | B07C 5/34 435/6.13 |
| 2011/0122994 A1 | 5/2011 | Grubsky et al. | |
| 2011/0202169 A1 | 8/2011 | Koehler et al. | |
| 2011/0210047 A1 | 9/2011 | Deppermann | |
| 2012/0085686 A1 | 4/2012 | Radema et al. | |
| 2013/0079918 A1 | 3/2013 | Spencer et al. | |
| 2013/0126399 A1 | 5/2013 | Wolff | |
| 2013/0176553 A1 | 7/2013 | Cope et al. | |
| 2013/0229647 A1 | 9/2013 | Fredlund et al. | |
| 2013/0231585 A1 | 9/2013 | Flagle et al. | |
| 2014/0050365 A1 | 2/2014 | Conrad et al. | |
| 2014/0058557 A1 | 2/2014 | Becker et al. | |
| 2014/0257135 A1 | 9/2014 | DeFreitas et al. | |
| 2014/0286474 A1 | 9/2014 | Sakuta et al. | |
| 2014/0328459 A1 | 11/2014 | Urano et al. | |
| 2015/0135585 A1 | 5/2015 | Cope et al. | |
| 2015/0165484 A1 | 6/2015 | Deppermann et al. | |
| 2015/0177067 A1 | 6/2015 | Golgotiu et al. | |
| 2015/0179391 A1 | 6/2015 | Ikeda et al. | |
| 2015/0321353 A1 | 11/2015 | McCarty, II et al. | |
| 2016/0250665 A1 | 9/2016 | Lampe | |
| 2016/0327478 A1 | 11/2016 | Hilscher et al. | |
| 2017/0131311 A1 | 5/2017 | Flagle et al. | |
| 2017/0295735 A1 | 10/2017 | Butruille et al. | |
| 2018/0029086 A1 | 2/2018 | Prystupa et al. | |
| 2018/0217072 A1 | 8/2018 | Chaudhary et al. | |
| 2019/0281781 A1 | 9/2019 | Borrowman et al. | |
| 2019/0285558 A1 | 9/2019 | Defreitas et al. | |
| 2019/0307055 A1 | 10/2019 | Kotyk et al. | |
| 2019/0346471 A1 | 11/2019 | Flagle et al. | |
| 2019/0374978 A1 | 12/2019 | Borrell et al. | |
| 2020/0015409 A1* | 1/2020 | de Bruin | A01C 1/00 |
| 2020/0055093 A1* | 2/2020 | Arlinghaus | B07C 5/3425 |
| 2020/0086353 A1 | 3/2020 | Becker et al. | |
| 2020/0182807 A1 | 6/2020 | Butani et al. | |
| 2021/0129188 A1 | 5/2021 | Borrowman et al. | |
| 2021/0140900 A1 | 5/2021 | Borrowman et al. | |
| 2022/0039766 A1 | 2/2022 | Defreitas et al. | |

FOREIGN PATENT DOCUMENTS

| | | | |
|---|---|---|---|
| CN | 204762022 U | * 11/2015 | |
| CN | 106650802 A | 5/2017 | |
| CN | 107238620 A | 10/2017 | |
| CN | 107683183 A | * 2/2018 | B07C 5/10 |
| DE | 202004007111 U1 | 8/2004 | |
| DE | 102004063769 A1 | 7/2006 | |
| DE | 102010030908 A1 | 1/2012 | |
| EP | 1046902 A2 | 10/2000 | |
| EP | 1743713 A1 | 1/2007 | |
| FR | 2549963 | 2/1985 | |
| JP | 2004515778 A | 5/2004 | |
| JP | 201255859 A | 3/2012 | |
| JP | 2013178242 A | 9/2013 | |
| JP | 2014060957 A | * 4/2014 | |
| JP | 2015500475 A | * 1/2015 | |
| UA | 90514 U | 5/2014 | |
| WO | WO03/084847 | 10/2003 | |
| WO | WO-2008150903 A1 | * 12/2008 | B07C 5/00 |
| WO | WO2008150903 A1 | 12/2008 | |
| WO | WO2009/093905 A1 | 7/2009 | |
| WO | WO-2010138574 A1 | 12/2010 | |
| WO | WO-2011115482 A1 | 9/2011 | |
| WO | WO2016133175 A1 * | 1/2012 | |
| WO | WO-2012001133 A2 * | 1/2015 | |
| WO | WO2016/157216 | 10/2016 | |
| WO | WO2018175555 A1 | 9/2018 | |

OTHER PUBLICATIONS

Jiang, et al., GPhenoVision: A Ground Mobile System with Multi-modal Imaging for Field-Based High Throughput Phenotyping of Cotton, Scientific Reports, Jan. 19, 2018, pp. 1-2.

Ideal System Co., LTD., "Three Step Color Sorting System," India Patent Application No. 5725/CEENP/2012, Jun. 29, 2012, 62 pages.

S. K. Kamra, The X-ray Contrast Method for Testing Germinability of Picea abies (L.) Karst. seed, Studia Forestalia Suecica Nr. 90, 1971, 28 pages, Skogshogskolan, Royal College of Forestry, Stockholm.

* cited by examiner

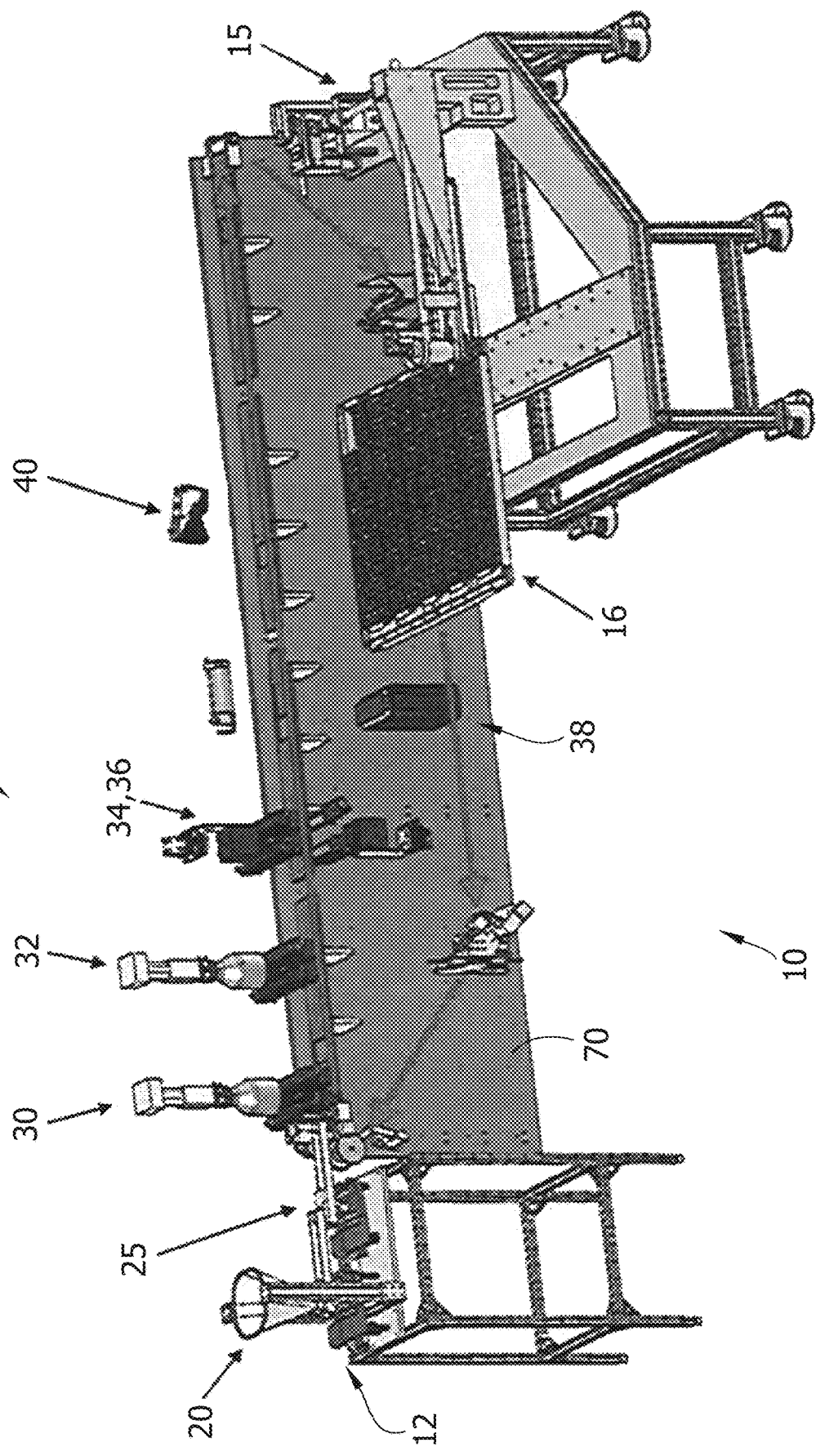

SEED IMAGING

The present disclosure generally relates to a system and method for processing seeds, and more specifically, a seed imaging system and method for imaging and storing seeds.

BACKGROUND

In the agricultural industry, and more specifically in the seed breeding industry, it is important for scientists to be able to analyze seeds with high throughput. By this it is meant that the analysis of the seeds preferably occurs not only quickly, but also reliably and with high total volume. Historically, seeds are categorized by size using mechanical equipment containing screens with holes corresponding to predetermined sizes. Seed categorization is also conducted using image analysis of the seeds to detect certain appearance characteristics of the seeds. However, prior seed image analysis systems are limited in their ability to detect the size, shape, and appearance of the seeds. As a result, prior image analysis systems have limited capabilities for characterizing seed shape and defects. Additionally, prior image analysis systems do not enable automated collection of statistically significant data quantities for the development of robust data models for determining correlations between seed batches using seed quality metrics.

SUMMARY

In one aspect, a seed imaging system for imaging seeds generally comprises a seed transfer station configured to move seeds through the system. An imaging assembly comprises a first camera mounted relative to the seed transfer station and configured to acquire images of the seeds as the seeds move through the system. A second camera is mounted relative to the seed transfer station and is configured to acquire images of the seeds as the seeds move through the system. The second camera has an imaging modality different from an imaging modality of the first camera.

In another aspect, a method of imaging seeds generally comprises moving seeds through the system using a seed transfer station; acquiring, using a first camera mounted relative to the seed transfer station, images of the seeds as the seeds move through the system via the seed transfer station; and acquiring, using a second camera mounted relative to the seed transfer station, images of the seeds as the seeds move through the system via the seed transfer station, an imaging modality of the second camera being different from an imaging modality of the first camera.

In yet another aspect, a seed imaging system for imaging seeds generally comprises a seed transfer station configured to move seeds through the system. An imaging assembly comprises a first camera mounted above to the seed transfer station and configured to acquire images of the seeds as the seeds move through the system. A second camera is mounted below to the seed transfer station and configured to acquire images of the seeds as the seeds move through the system.

BRIEF DESCRIPTION OF THE DRAWING

FIG. 2A is another perspective of the seed imaging system showing the imaging and analysis assembly;

Corresponding reference characters indicate corresponding parts throughout the drawings.

DETAILED DESCRIPTION

Figure 1:
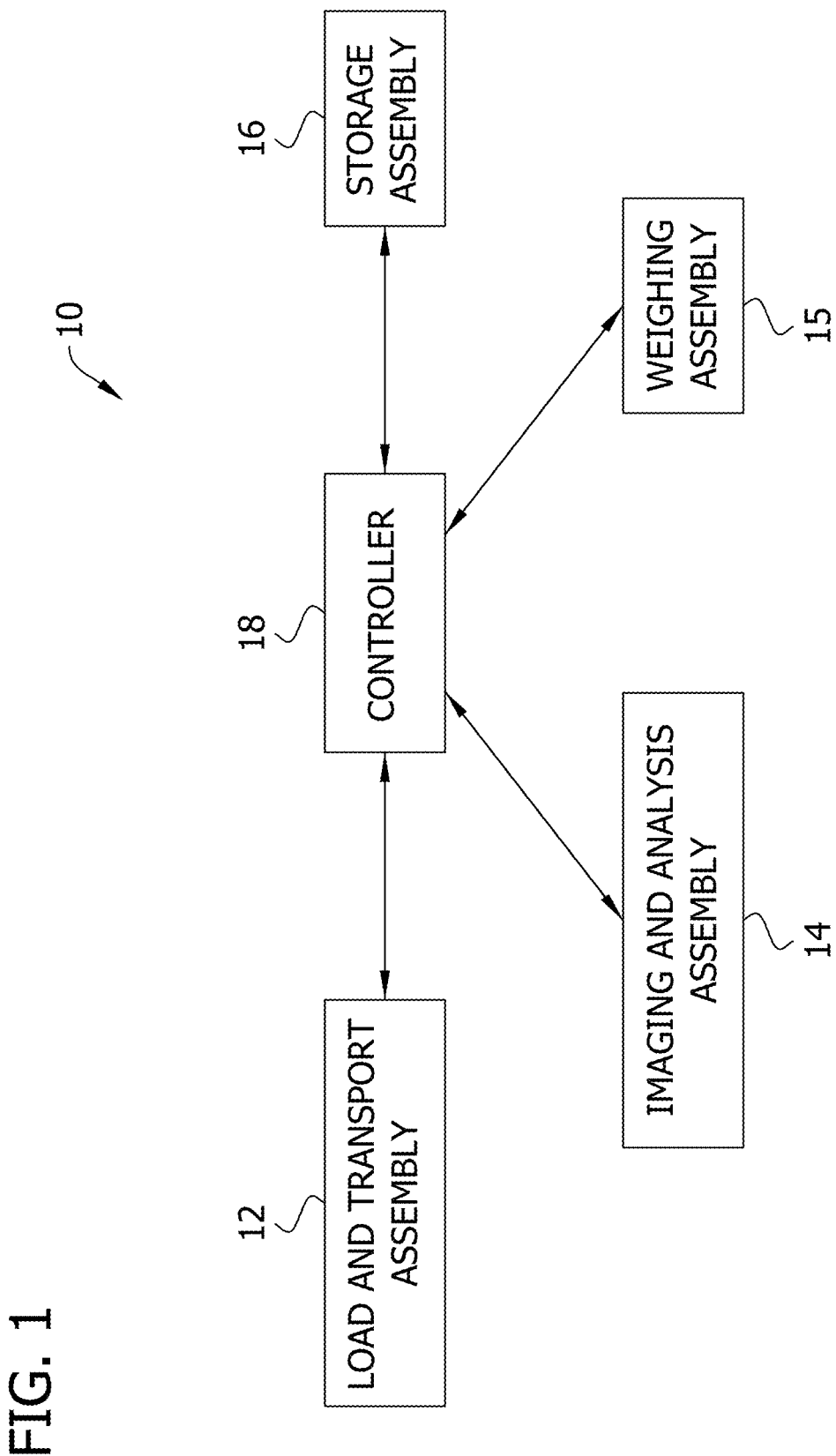
FIG. 1 is block diagram of an automated seed imaging system.
Figure 2:
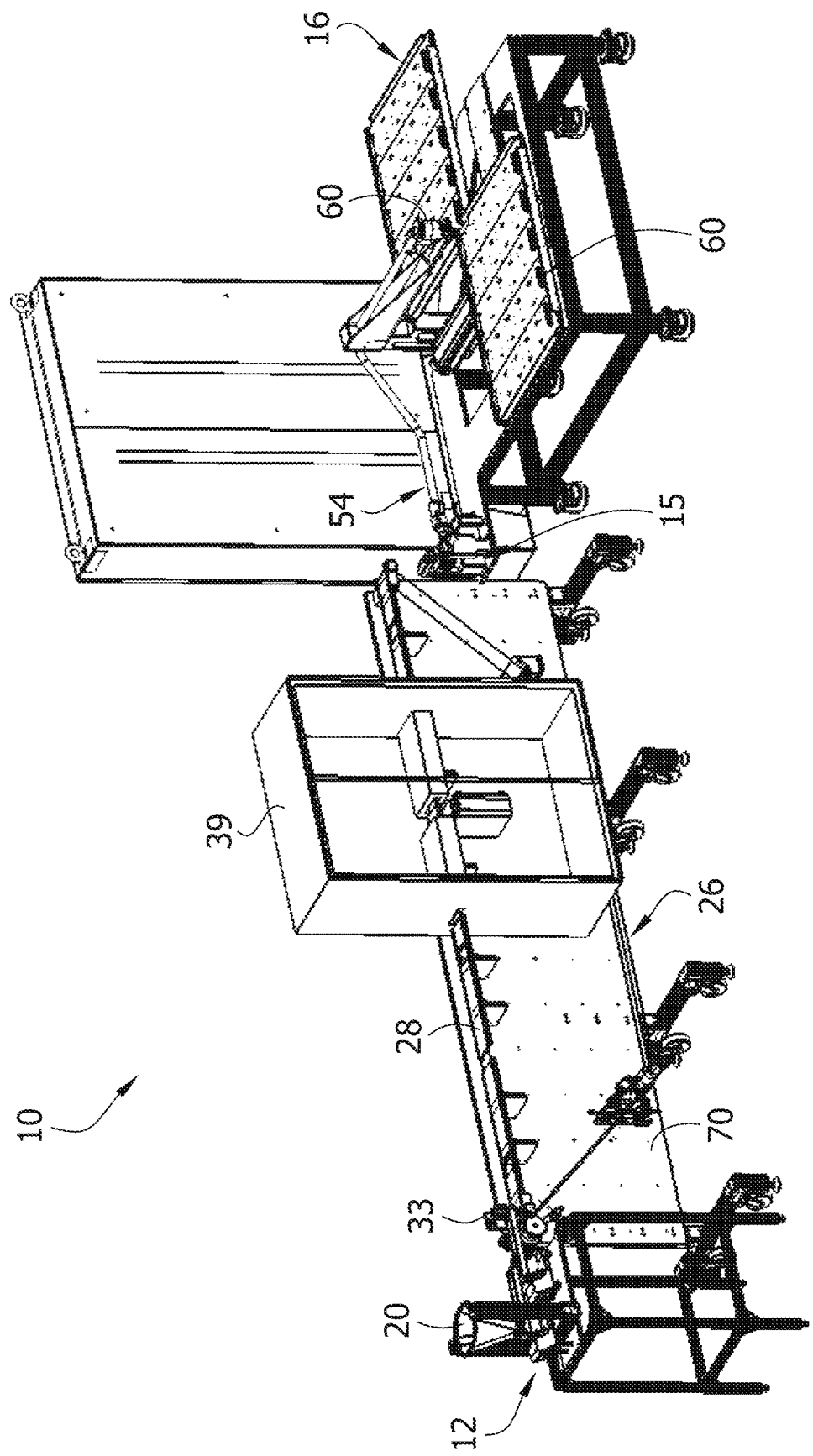
FIG. 2 is a perspective of the seed imaging system with an imaging and analysis assembly of the system removed.
Figure 2B:
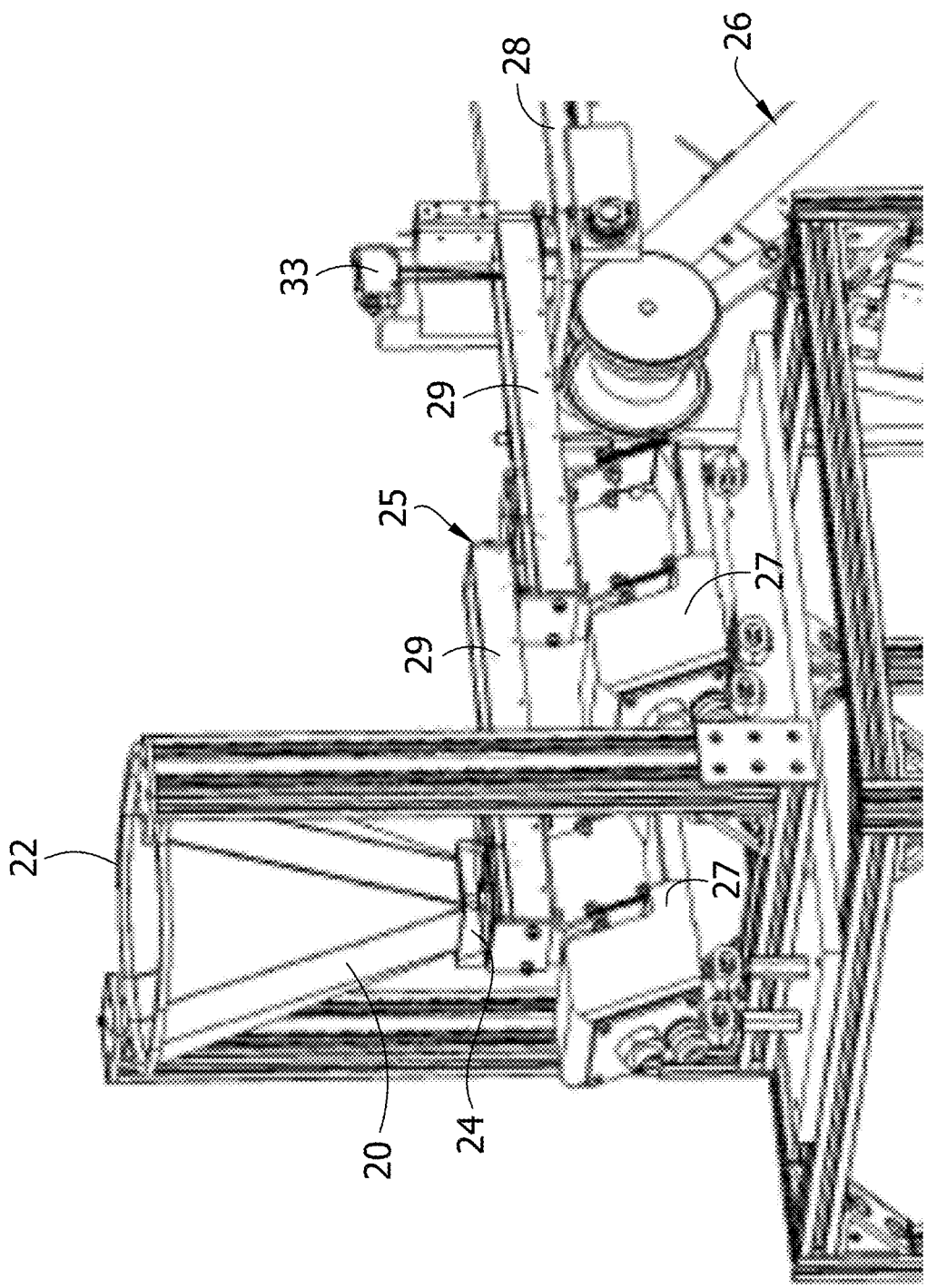
FIG. 2B is an enlarged fragmentary perspective of FIG. 2.
Figure 3:
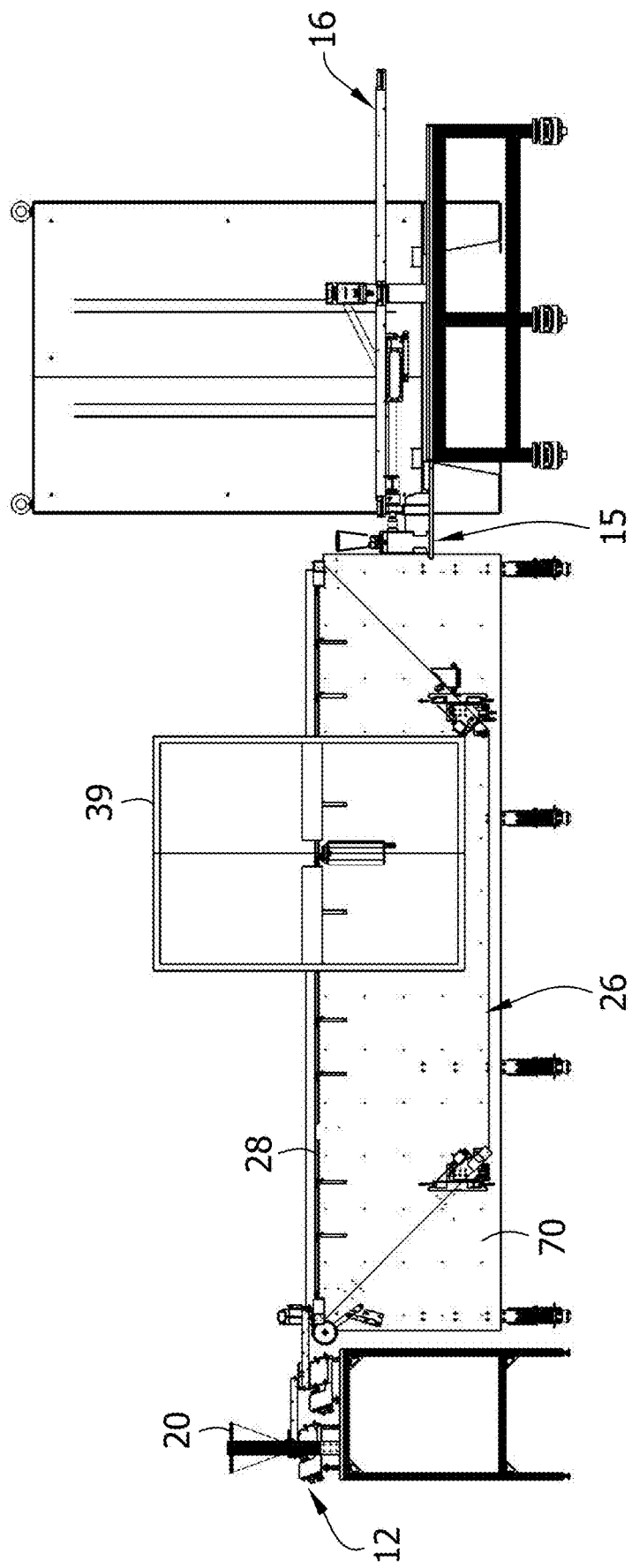
FIG. 3 is a front view of the seed imaging system with the imaging and analysis assembly removed.
Figure 4:
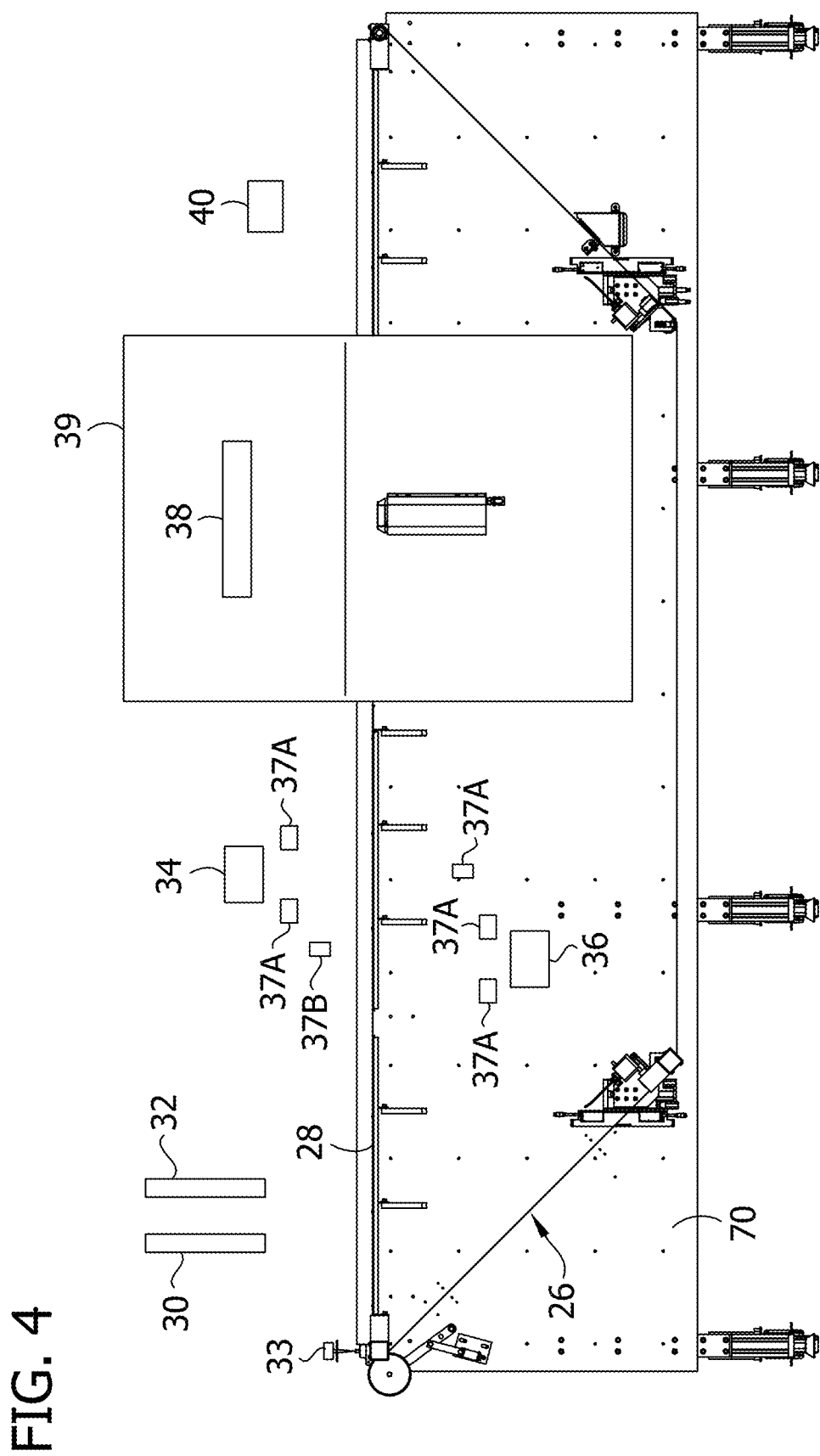
FIG. 4 is an enlarged fragmentary view of FIG. 3 showing the imaging and analysis assembly schematically.
Figure 5:
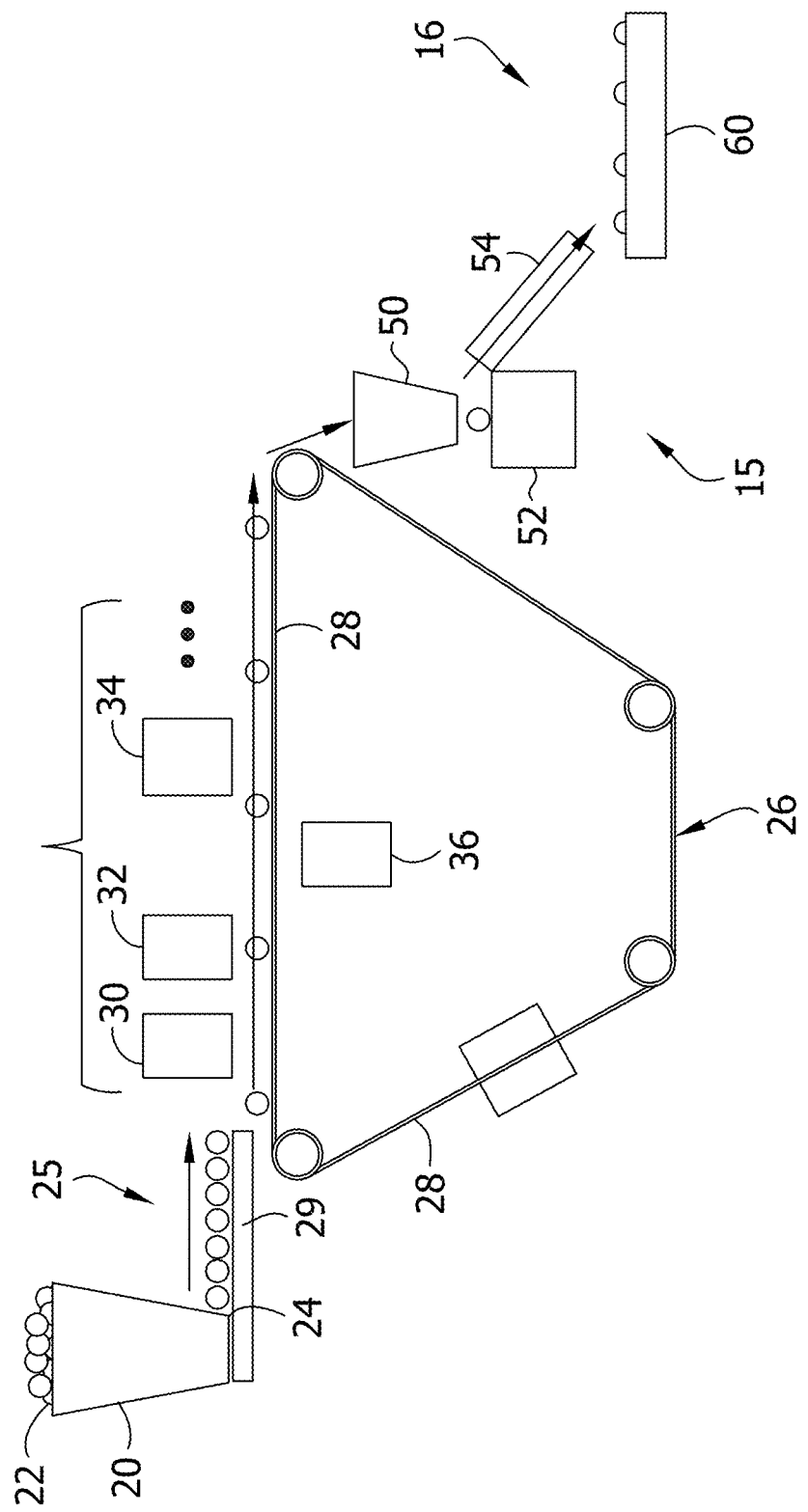
FIG. 5 is a schematic illustration of the seed imaging system.
Figure 6:
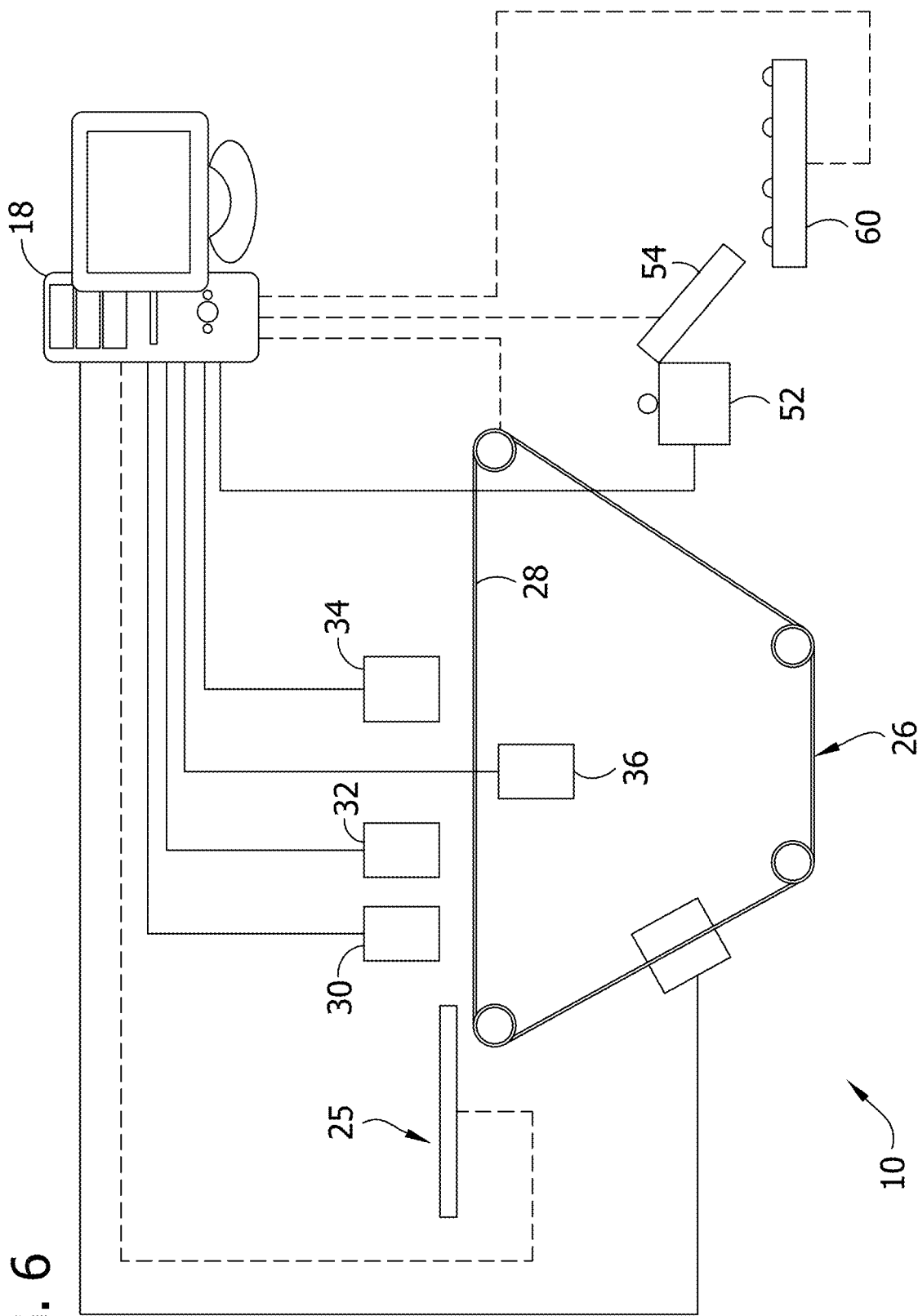
FIG. 6 is another schematic illustration of the seed imaging system.
Figure 7:
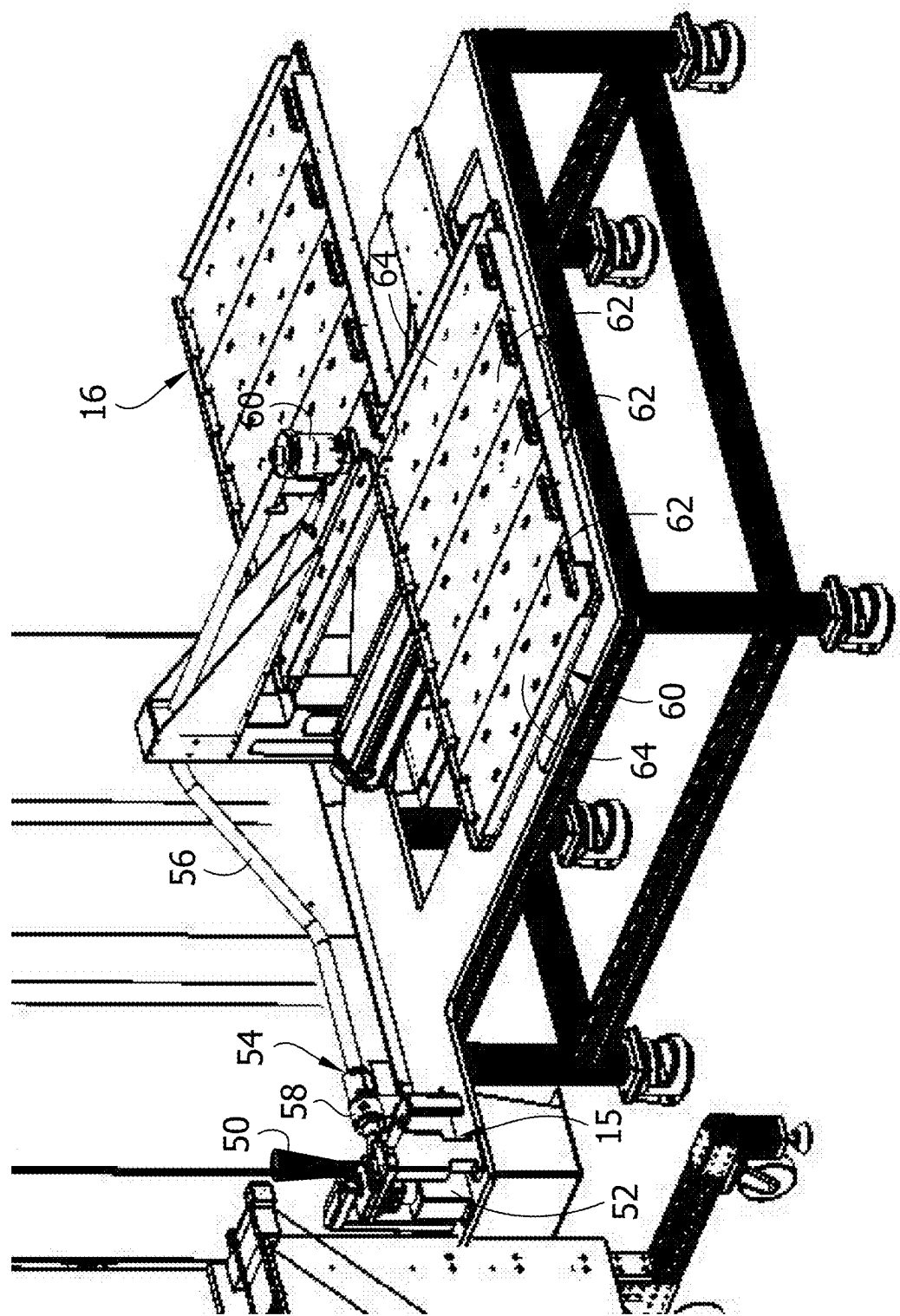
FIG. 7 is an enlarged fragmentary view of FIG. 2.

Referring to FIGS. 1-2A and 3-6, a seed imaging system is indicated generally at 10. The system is configured to receive, analyze, and store a plurality of seeds for later processing, assessment, and/or analysis. The system 10 comprises a load and transfer assembly 12 configured to receive and deliver the seeds through the system, an imaging and analysis assembly 14 for collecting image data of the seeds as they are delivered through the system by the load and transfer assembly, a weighing assembly 15 for weighing the seeds, and a storage assembly 16 configured to store the seeds for later processing. A controller 18 (e.g., a processor and suitable memory) is programmed to operate the system 10. The imaging and analysis assembly 14 acquires image data and incorporates optimized image analysis algorithms for providing rapid and highly accurate seed characteristics, including one or more of color, size, shape, texture, internal composition, mass, volume, moisture content, and chemical composition data of the seeds which provide a complete picture of the appearance and condition of the seeds. Being able to capture the full internal and external picture of the seed allows the system 10 to reliably detect defects in the seeds.

The imaging and analysis assembly 14 combines multiple imaging modalities to measure the color, size, shape, texture, and internal characteristics of the seeds, for example, which provides a more accurate indication of their appearance and condition. The storage assembly 16 is configured to store the seeds in microplates for later processing, assessment, and/or analysis. In one or more other examples, the storage assembly may be configured to individually sort seeds in two or more bulk fractions, such as at the end of the load and transfer assembly 12. For example, pulses of air may direct the seeds, depending on the analyses performed on the seeds, into one or more bulk containers. Additionally, the system 10 is designed for acquisition of high-content data. Image data (e.g., color, internal characteristics, shape, etc.) will be mined from the high-content data to extract the best predictors of quality. A high-throughput belt system may subsequently be incorporated to collect those features using faster imaging devices.

Referring to FIGS. 2-6, the load and transfer assembly 12 comprises a hopper (broadly, a seed loading station) 20 including an inlet 22 for receiving the seeds into the hopper and an outlet 24 for dispensing the seeds from the hopper, a vibratory feed 25 at the outlet for singulating the seeds as they are dispensed from the outlet, and a conveyor 26 (broadly, a seed transfer station) at an outlet of the vibratory feed. The vibratory feed 25 comprises a pair of vibratory feeders 27, and a pair of vibratory channels 29 associated with a respective vibratory feeder. The vibratory feeders 27 use vibratory energy to transport the seeds along the vibratory channels 29 and arrange the seeds into a single row. The vibratory energy also spaces the seeds from each other within the row so that each seed can be individually imaged by the imaging and analysis assembly 14 once the seed are transported to the conveyor 26. Vibratory feed rates may be controlled by the controller 18. Although a vibratory feed 25 is shown, it is envisioned that other methods for singulating the seeds can be used. In one embodiment, a singulation wheel (not shown) can be used. Additionally, a tracking sensor 33 is located at an outlet of the vibratory feed 25. The tracking sensor 33 registers each seed as it leaves the vibratory feed 25. The tracking sensor 33 allows the system 10 to track each seed prior to being imaged in order to momentarily stop the vibratory load, if necessary, to allow ample spacing between the seeds prior to imaging. Additionally, the tracking sensor 33 allows for the imaging data collected by the imaging and analysis assembly 14 to be properly associated with the correct seed.

In the illustrated embodiment, the conveyor 26 comprises a belt 28 defining a flat horizontal conveyor transport surface. The conveyor 26 provides a flat surface for the seeds to rest as they are delivered through the system 10. As a result, the system 10 is able to better control the travel of each seed through the system and therefore better track the position of the seeds as they move on the conveyor 26 because the seeds will remain in a substantially fixed orientation and position on the conveyor. In one embodiment, a high precision encoder (not shown) is incorporated into the system 10 to track the position of the seeds on the conveyor 26. The encoder may work in combination with, or include, the tracking sensor 33. The encoder may also act as a master timing device to trigger the different imaging modalities to acquire their images. As will be explained in greater detail below, the flat surface allows for more accurate measurements to be acquired by the imaging and analysis assembly 14. Moreover, in one example, being able to accurately track the position and location of the seeds as they travel on the conveyor 26 allows the system 10 to locate each seed for placement in a microplate of the storage assembly 16 for later assessment. The seeds may be loaded on the conveyor from multiple supply channels, whereby the seeds are singulated in parallel along the length of the belt, for example. In another example, the seeds may be loaded into onto trays (e.g., each cell received in a cell of a "scan tray," and the tray with loaded seeds may be transported along the conveyor. Thus, each seed within a corresponding cell or position on the tray is imaged and analyzed so that the acquired data is associated with the location of the seed on the tray (i.e., the seeds are tracked by their corresponding cell or position on the tray).

The conveyor 26 may be a low-speed conveyor operating at speeds of about 5-10 seeds/minute. In one or more other embodiments, the conveyor may operate at speeds of about 30-100 seeds/minute or other rates. The speed of the belt 28 may be controlled by the controller 18. In one embodiment, the conveyor 26 is transparent. The transparent nature of the conveyor 26 allows for imaging from underneath the conveyor to be performed, as will be explained in greater detail below. However, the conveyor can be translucent or semi-transparent without departing from the scope of the disclosure. In one embodiment, the belt 28 is formed from Mylar. Other materials including optically and X-ray transmissive materials are envisioned without departing from the scope of the disclosure. A coating may also be applied to the belt 28 of the conveyor 26. The coating may be configured to repel dust and/or have scratch resistant properties which can help keep the belt 28 clean and free of marks which can impair the ability of the imaging and analysis assembly 14 to acquire clear images. Additionally or alternatively, a plurality of ionizers (not shown) may be provided to dissipate static charges on the system 10 to reduce adherence of fine particulate matter on the conveyor 26. In one or more other embodiments, the seeds may be loaded on "scantrays," which are placed on the conveyor, to image and track individual seeds by multiple modalities. The collected data may be be used for data fusion and multimodal classifier training.

Referring to FIGS. 2-6, the imaging and analysis assembly 14 comprises a first hyperspectral reflectance camera 30 mounted above the conveyor surface for collecting and processing image data across the electromagnetic spectrum. In one embodiment, the first hyperspectral reflectance camera 30 obtains image data across the visible light spectrum. The first hyperspectral reflectance camera 30 may have a spectral range from about 400 nm to about 900 nm. However, a different spectral range is envisioned without departing from the scope of the disclosure. A second hyperspectral reflectance camera 32 is mounted above the conveyor surface for collecting and processing image data across the electromagnetic spectrum. In one embodiment, the second hyperspectral reflectance camera 32 obtains image data across the near-infrared spectrum. The second hyperspectral reflectance camera 32 may have a spectral range from about 1000 nm to about 1700 nm. However, a different spectral range is envisioned without departing from the scope of the disclosure. Hyperspectral cameras look at objects using a wide range of the electromagnetic spectrum. This is in contrast to the human eye which sees only visible light in the red, green and blue spectrum. However, certain objects can leave unique fingerprints in the electromagnetic spectrum. These fingerprints can help identify the materials that make up a scanned object. In the current instance, seeds imaged by the hyperspectral reflectance cameras 30, 32 can leave fingerprints which can indicate certain conditions of the seed. The imaging and analysis assembly 14 also includes a processor and memory for processing (i.e., analyzing) the image data, although in other embodiments the controller 18 may be used for such processing. Hyperspectral cameras may also be added below the belt to image the bottom of the seed for interrogation of over 90% of the full surface area of the seed. Belt materials can be chosen to be largely transparent throughout the spectral range of interest. In all cases, the samples are illuminated with line source light assemblies that have spectral outputs covering the range of the hyperspectral cameras. For example, quartz tungsten halogen and similar bulbs may be used.

A first 2D line scan red-green-blue (RGB) camera (broadly, a first 2D camera) 34 is mounted above the conveyor surface for acquiring image data of the seeds to measure the color, size, shape, and appearance of the seeds in two dimensions, and a second 2D line scan RBG camera (broadly, a second 2D camera) 36 is mounted below the conveyor surface for acquiring image data of the seeds to measure the color, size, shape, and appearance of the seeds in two dimensions. In one embodiment, the top 2D camera 34 is mounted above the conveyor 26 in a substantially vertical orientation such that a focal axis of the camera extends perpendicular to a horizontal plane of the conveyor, and the bottom 2D camera 36 is mounted below the conveyor in a substantially vertically orientation such that a focal axis of the camera extends perpendicular to a horizontal plane of the conveyor. Length and width dimensions of the seeds can be calculated using an image processing routine executed by the controller 18. With the length and width dimensions of the seeds, the areas of each seed can be calculated. Each 2D camera 34, 36 is configured to image a 150 mm lane on the belt 28 of the conveyor 26 with a spatial resolution of about 0.14 mm. One example of a suitable 2D camera is the CV-L107CL model by JAI.

Additionally, each 2D camera 34, 36 has an associated light assembly 37 for illuminating the fields of view of the cameras 34, 36 to assist in producing clear and bright images. Each light assembly 37 comprises a pair of top white lights 37A and a back blue light 37B. The light assemblies 37 provide lighting that compliments the clear conveyor belt 28 so that the images from the cameras 34, 36 are clear and bright. The field of view for the top 2D camera 34 is illuminated by the white lights 37A mounted above the conveyor surface and the blue light 37B mounted below the conveyor surface. Conversely, the field view for the bottom 2D camera 36 is illuminated by white lights 37A mounted below the conveyor surface and the blue light 37B mounted above the conveyor surface. Using only the top and bottom 2D cameras, the imaging assembly 14 is able to image over 90% of the surface of each seed. In a similar embodiment, additional top and/or bottom cameras may be added in orientations off-perpendicular to the conveyor 26. These cameras may be used in conjunction with the top 2D camera 34 and/or the bottom 2D camera 36 for detailed defect inspection over a larger portion of the seed surface area.

Figure 9:
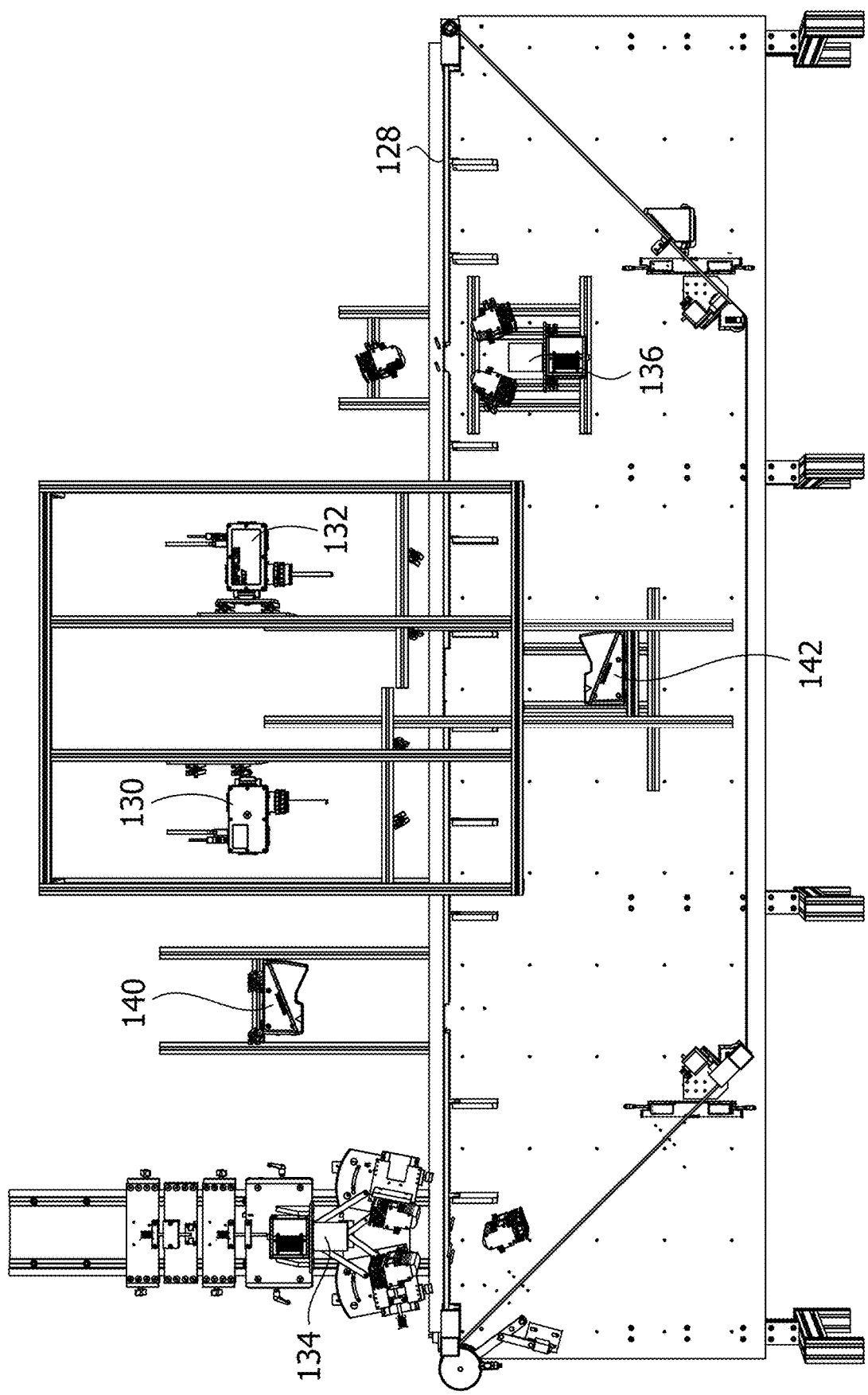
FIG. 9 is a front view of a seed imaging system of another embodiment.

Although the illustrated embodiment shows the hyperspectral cameras 30, 32 mounted upstream of the 2D cameras 34, 36, it is envisioned that at least one of the 2D cameras could be mounted upstream of the hyperspectral cameras so that the 2D camera is the first imaging device passed by the seeds (see FIG. 9). In this embodiment (FIG. 9), top 2D camera 134 is mounted upstream of hyperspectral cameras 130 and 132 and can be used to locate a seed for predicting when the seed will arrive at the hyperspectral cameras to predict when to trigger the hyperspectral cameras so that only seed region data is acquired and/or saved. This has the benefit of dramatically reducing file size and may prevent computer memory issues. In this embodiment, bottom 2D camera 136 is disposed between the two hyperspectral cameras 130, 132 along the conveyor path. Also, in addition to top 3D camera 140 (which may be the same or similar to 3D camera 40), a second 3D camera 142 (which may be the same or similar to the top 3D camera 140) is mounted below conveyor belt 128. Although not shown in FIG. 9, an x-ray camera, like x-ray camera 38 in FIG. 2A and described below, can also be incorporated into the imaging assembly.

The imaging and analysis assembly 14 further comprises an X-ray camera 38 mounted above the conveyor surface and an X-ray source below the belt for producing radiation detected by the X-ray camera to acquire X-ray images of the seeds. The X-ray camera 38 is housed within an X-ray enclosure 39 which also allows passage of the conveyor belt 28 through the enclosure. In particular, the enclosure 39 includes a passage (FIG. 3) through which the belt 28 travels. An opening in the passage provides a window for the X-ray camera 38 to view the belt 28 so that the seeds traveling on the belt can be imaged by the X-ray camera 38. In one embodiment, the X-ray camera 38 comprises a low-energy X-ray TDI (time delay and integration) camera. TDI technology is based on the concept of accumulating multiple exposures of a moving object, effectively increasing the integration time available to collect incident light. In fact, to accommodate the seeds on the moving conveyor 26, the preferred imaging technique for all the imaging modalities of the system 10 is a push-broom linescan method where the moving seeds are imaged one line at a time. The imaged lines may be accumulated at a frame rate referenced to the speed of the belt 28. In the embodiment shown in FIG. 10, inner and outer enclosures for the X-ray source is shown. The internal enclosure 139A inhibits most of the X-ray emissions and protects the other imaging equipment, while allowing the seeds and belt to pass through. The outer enclosure 139B stops any X-rays that come out of the inner enclosure 139A (primarily the openings where the seeds go in and out) from exiting outside the device (e.g., into a lab).

A 3D line laser profiler (broadly, a 3D camera) 40 is also mounted above the conveyor surface for acquiring 3D image data of the seeds to measure the size and shape of the seeds in three dimensions. In one embodiment, the 3D camera 40 is mounted above the conveyor in a substantially vertical orientation such that a laser of the camera projects substantially perpendicular to a horizontal plane of the conveyor 26, and a focal axis of the camera extends at an angle slightly skewed from vertical such that a focal axis of the 3D camera extends at a non-orthogonal angle to the plane of the conveyor. The 3D camera 40 projects a line laser to create a line profile of the seed's surface. The 3D camera 40 measures the line profile to determine displacement which is represented by an image of the seed showing varying pixel intensities corresponding to height differences. A thickness dimension is obtained through the pixel intensity of the 3D image produced by the 3D camera 40. For example, a maximum pixel intensity can be interpreted as a marker of seed thickness. Thus, as the seeds pass through the focal window of the 3D camera 40, a thickness of each seed is recorded as the maximum pixel intensity detected by the 3D camera for each seed. To acquire an accurate thickness measurement, it may be necessary to calibrate the distance measurement of the 3D camera 40 based on objects of known height. Using the length and width dimensions acquired from the 2D cameras 34, 36 and the thickness dimensions acquired from the 3D camera 40, the system 10 can obtain volume estimates for each seed. In another embodiment, more sophisticated image processing may be used to estimate volume from a detailed contour map of the top half of each seed. Moreover, a second, bottom 3D camera (not shown) could generate a detailed contour map of the bottom half of the seed. The contour maps from the top and bottom 3D cameras can be combined to provide a more complete estimate of the overall seed volume. In either case, for a known (such as measured by seed weighing mechanism 15) or estimated weight of the seed, the volume data can be used to estimate seed density. One example of a suitable 3D camera is the DS1101R model by Cognex.

Figure 10:
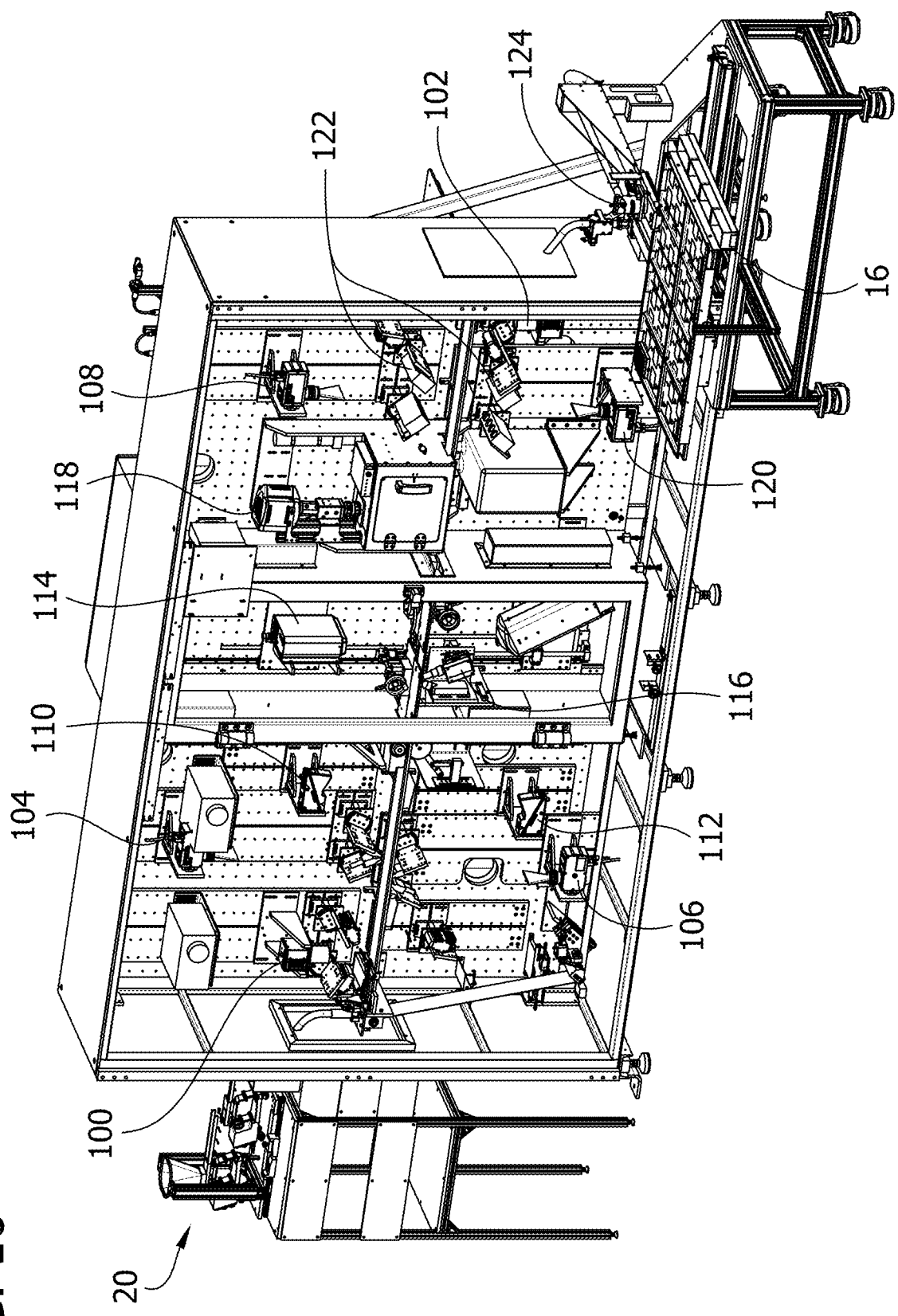
FIG. 10 is another embodiment of a seed imaging system.

Additional imaging devices can also be mounted in the system 10 for acquiring additional image data. For example, additional hyperspectral cameras including optical fluorescence, optical polarization imaging, a 1D NMR spectroscopy device, and/or a microwave measurement system can be mounted in the system 10 to provide additional data for the seeds. In one example, as shown in FIG. 10, one or more of the following modalities are included: Top RGB 100; Bottom RGB 102; Top Visible Hyperspectral 104; Bottom Visible Hyperspectral 106; Top NIR Hyperspectral 108; Top Laser Profilometer 110; Bottom Laser Profilometer 112;

X-ray Absorption Imaging 114; X-ray Fluorescence Spectroscopy 116; Laser Fluorescence Spectroscopy 118; Bottom NIR Hyperspectral 120; NIR backlight using polarized light 122; and Mass measurement 124 (seed weighing).

Generally, combining data from two or more imaging modalities may provide improved prediction compared with a single method. For example, as shown in FIG. 10, identification of defective seeds may be improved by supplementing external appearance images from the RGB cameras 34, 36 with images from the X-ray camera 38 for inspection of naturally occurring abnormalities of internal seed structure or damage arising from seed processing steps. The prediction may be further enhanced by adding 3D camera 40 data for detailed characterization of shape, surface area, volume, and single-seed density, with the latter derived by combining volume with seed mass measured on the weighing assembly 15. Optical hyperspectral VIS-NIR reflectance 30, 32 and fluorescence can also be added to provide additional information about near-surface contamination, disease, and composition, which may affect seed viability. 1D-NMR and X-ray Fluorescence (XRF) can provide additional insights into bulk composition of the seed, including internal oil, water, and other constituents. Collectively, these techniques form a detailed set of external appearance, internal structure, and bulk features at a single-seed level for a more complete characterization of defective seed relative to viable seed. The selection of techniques and predictive features from each modality may be not be intuitive and revealed only with machine learning and other combinatorial data modeling methods.

The preservation of seed orientation in each top or bottom imaging modality as it travels along the belt 28 permits alignment of images from different techniques using registration methods in post-acquisition software processing. The combination of all imaging techniques applied to spatially-localized regions, possibly as small as a single pixel, may yield fingerprints of defects and physiological structures that would be difficult to classify using a single method. For example, the combination of spectral signatures from the hyperspectral cameras 30, 32 with local height data from the 3D camera 40 and attenuation changes in the images from the X-ray camera 38 can indicate an abnormality on or near the surface of the seed which may be difficult to identify by current manual inspection methods or to classify using features derived from analysis of the entire seed area. A similar approach may be employed to identify small physiological structures in the seed, such as the embryo region.

Co-localizing defects with physiological seed structures may improve quality prediction since the effect of the defect may depend on location on the seed. For example, disease or damage in the embryo region of the seed may have a more pronounced impact on seed vitality compared with defects elsewhere on the seed. In this example, after using a combination of imaging techniques to accurately identify the embryo region, a similar procedure may be used to identify localized abnormalities, possibly with a different combination of techniques. Single-seed quality scoring data may then be used as a response variable to examine the effect of defect location relative to embryo or other critical seed structures. Additionally or alternatively, the scoring data may be used to define a characteristic localized combinatorial signature of an embryo or other region which predicts poor seed quality. These approaches would not be possible if the seeds were transported to different instruments for acquisition of imaging data since the seed orientation could not be reliably maintained for each technique.

Using real-time image processing-based thresholding methods, single seeds may be discriminated from the belt background and isolated in the field of view for each imaging modality. This ensures that only seed data is retained reducing the size of the image files. Also, because the vibratory feed 25 produces a set spacing between the seeds, and the belt speed can be set by the controller 18, the images produced from each imaging modality can be associated with a given seed. Additionally or alternatively seed detection from one imaging technique may be used to anticipate seed arrival at another technique and trigger the camera acquisition appropriately. Image files from each imaging modality may be saved independently or combined in a single image file with multiple layers of data consisting of the separate image data from all modalities. In either case, the identity of each seed is maintained across all modalities which avoids labeling error. Also, because the orientation of the seeds is the same for all imaging modes, correlations among the different modes can be made. For example, defects visibly apparent on the outside of the seed and imaged by the optical cameras may correlate with internal structures observed in the X-ray images. By maintaining seed identity in the single-seed identity storage mechanism 16 for post-imaging quality assays (e.g., RET (radicle emergence test), germination, and vigor testing), single-seed imaging data can be mined to extract relevant spatial and/or structural features from one or more imagining modalities that provide intrinsic seed quality data. Additionally, the source of seed damage can be determined by analyzing the seeds at different stages throughout seed processing (e.g., harvesting, transporting, processing, or sorting). To this effect, process-induced mechanical damage and the effects of formulation and the application rate of seed treatments can be determined.

The imaging and analysis assembly 14 is configured to determine circularity, solidity, and smoothness from the images produced. It will be understood by those skilled in the art that the system 10 may include image analysis software for processing the images to obtain the color, mean and variation in spectrum, size, shape, texture, and internal composition information for the seeds for any or all of the individual modalities or specific wavelengths in the hyperspectral data. For example, the software may incorporate machine learning analysis which facilitates the production of detailed image data. Typical modeling methods include Partial Least-Squares discriminate analysis (PLS-DA), neural networks, Support Vector Machines (SVM), logistic regression, and other methods. Because the imaging and analysis assembly 14 acquires images using multiple imaging modalities including hyperspectral imaging, 2D imaging, 3D imaging, and X-ray imaging, and because the images are obtained from the top and bottom of the seeds, the assembly can acquire a complete picture of the condition of the seeds in three dimensions. This complete picture includes data concerning the length, width, thickness (or roundness), solidity, smoothness dimensions, and internal composition of the seeds. The various imaging modalities produce image data which is analyzed by the controller 18. Data extracted from the imaging modalities includes average and variance of optical spectra from the image data produced by the hyperspectral cameras 30, 32, and attenuation characteristics in the image data obtained by the X-ray camera 38. These characteristics may include internal structural features and external cracks. Also, general size, shape, and color data from the 2D cameras 34, 36 and 3D camera 40 is extracted and analyzed by the controller 18.

Based on the measurement data from the cameras 30-40, the controller 18 can identify and categorize each seed according to its appearance. For example, a quality score may be assigned to each seed based on the data from the imaging and analysis assembly 14. The quality score can be used as the response variable for a prediction model used to classify other seeds processed in the system 10. Also, being able to acquire image data from multiple imaging modalities allows the system to tailor the image analysis process for a particular use. For example, image data from each imaging modality can be compared to each other to determine which imaging modality provides the most reliable indication of the condition of the seed. Also, correlations between the different imaging modalities can be formed. Thus, the characteristics of a seed determined by one imaging mode, embodied in the image data of the imaging mode, can be compared to the image data from another mode to find correlations in the two data sets. This may allow for one imaging mode to function as a verification of the image data acquired by another imaging mode. Also, one imaging mode could be used instead of another imaging mode if their image data was found to have a correlation. This could serve as a cost saving in the instance where image data from the 2D cameras 34, 36 was found to correlate with the image data from the significantly more costly X-ray camera 38. Thus, the 2D camera 34, 36 would be used instead of the more costly X-ray camera 38. Conversely, the imaging data from the separate imaging modalities could be combined to provide a more robust modeling tool. Combining the imaging data may enhance the overall prediction power of the system as compared to using each imaging modality separately.

Similarly, predetermined appearance categories may be stored in the controller 18. The appearance categories may be based on measurement thresholds or ranges for each of the color, spectral characteristics, length, width, circularity, solidity, smoothness, and internal composition data. Based on these thresholds/ranges, at least two categories can be defined. For example, the measurement data can be used to provide thresholds or ranges which indicate the seed as either healthy or defective. As each seed is analyzed the seed is associated with one of the categories. For example, a seed having one or more dimensions that are outside of a range of values, or above/below a threshold value, are categorized into a first, defective category; and seeds having one or more dimensions that are within a range of values, or above/below a threshold value, are categorized into a second, healthy category. Multiple range/threshold values may be established to further categorize the seeds into more than two categories.

To maintain accuracy and repeatability of all imaging modes, provisions for checking the proper functionality and calibration of the cameras can be added to the system 10. For instance, time-stable reference samples can be designed to include spectral, spatial, and X-ray transmission standards. These standards may include reflectance and fluorescence targets, spatial calibration targets (e.g., line-pair or similar geometric patterns), height references, and X-ray targets (e.g., a variable thickness sample machines from synthetic material). The standards can be imaged at periodic intervals (e.g., start of each batch) and imaging processing methods will be used to check the status of the imaging hardware and perform any necessary re-calibrations.

Referring to FIGS. 2, 3, and 5-7, the weighing assembly 15 is located at a delivery end of the conveyor 26 for receiving and weighing each seed individually. In the illustrated embodiment, the weighing assembly 15 comprises a collection mechanism 50 for receiving the seeds as they are expelled from the conveyor 26, a scale 52 at an outlet of the collection mechanism for weighing the seeds, and a transport mechanism 54 for transporting the seeds from the weighing assembly 15 to the storage assembly 16. The collection mechanism 50 comprises a funnel that collects the seeds from the end of the conveyor 26 and drops the seeds onto the scale 52. The scale 52 comprises a static load cell configured to measure the weight of each seed individually. Once a seed has been weighed, the transport mechanism 54 delivers the seed to the storage assembly 16. The transport mechanism 54 comprises a transport tube 56 and a vacuum 58 attached to the transport tube. The vacuum 58 conveys each seed through the transport tube 54 to a seed collector 60 where each seed is held prior to being stored in the storage assembly 16.

Figure 8:
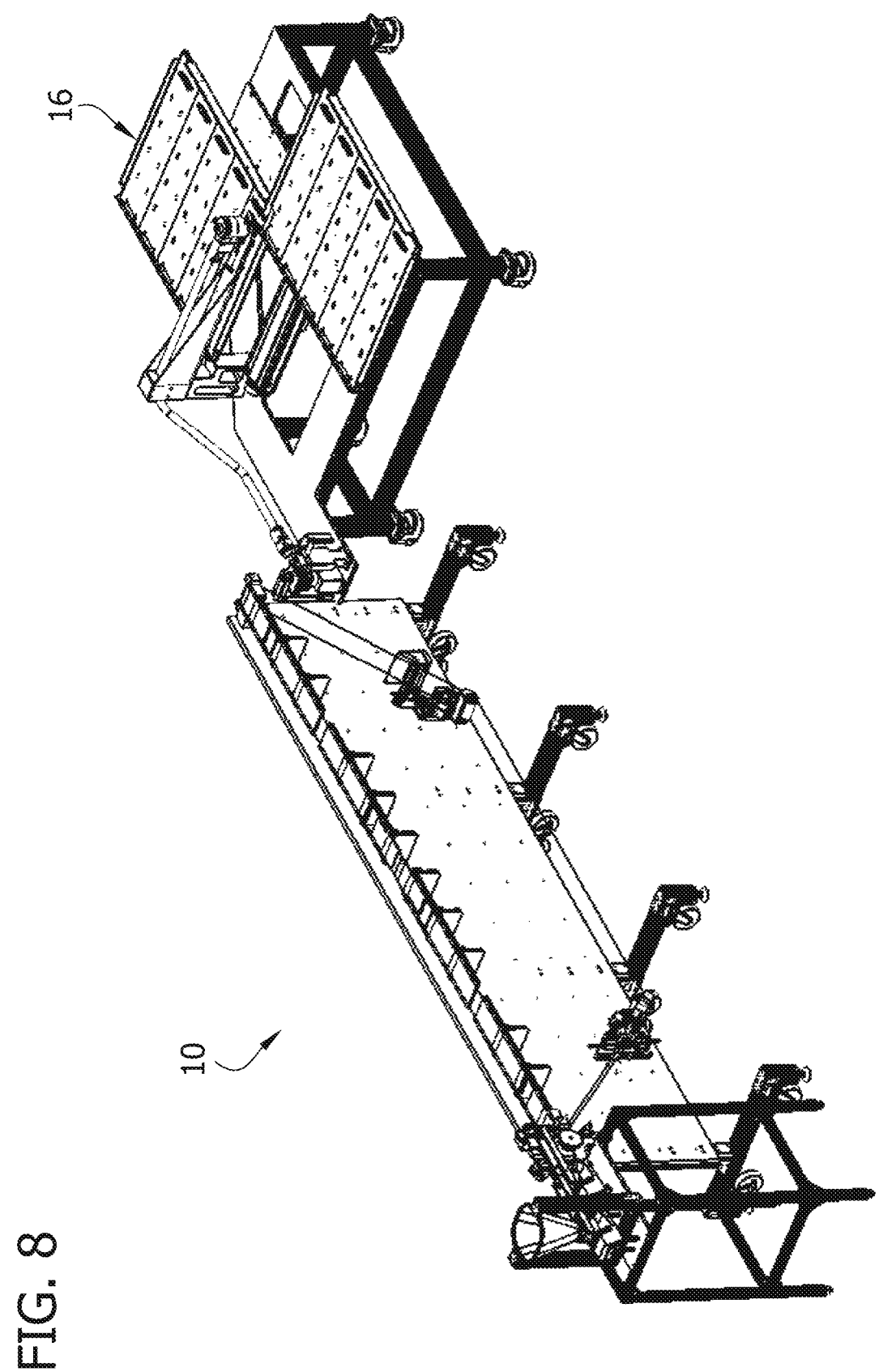
FIG. 8 is a perspective of a seed imaging system of another embodiment.

Referring to FIGS. 2, 3, and 5-7, the storage assembly 16 comprises the seed collector 60 and a collection bank including a plurality of wells 62 arranged in an x-y grid and pre-loaded with microplates 64. The seed collector 60 drops each seed into a dedicated microplate 64 well position. The seeds may be allowed to grow within the microplates 64 and the growth of the seeds is monitored. Having the imaging data saved for each seed allows correlations to be made between the imaging data and seed germination. As a result, the system 10 can determine which imaging modalities provide the best prediction capabilities for a given lot of seeds. Rather than growing the seeds in the microplates, the seeds can be transferred to other seed quality measurement techniques as long as seed identity is maintained. In the illustrated embodiment of FIG. 2, the storage assembly 16 is shown in a folded configuration which reduces the overall footprint of the system 10. However, the storage assembly 16 could be arranged in a generally co-linear configuration (FIG. 8) with the rest of the system 10. The co-linear configuration provides greater accessibility to the components of the system 10 for repair and replacement.

In the illustrated embodiment, the storage assembly 16 includes microplate storage. However, other storage methods are envisioned. For example, a gel-based format storage method may be used when it is desirable to perform radicle-emergence testing. Additionally or alternatively, a wet towel storage method may be used for germination assays. Additionally or alternatively, a soil-based storage format may be used for greenhouse and/or field transplant testing.

In the illustrated embodiment, the conveyor 26 is mounted to a support wall 70. The imaging and analysis assembly 14 could also be mounted on the support wall. However, the components of the system 10 could be located in a different fashion without departing from the scope of the disclosure.

Referring to FIGS. 2-6, seeds are first placed in the hopper 20 in preparation of being transported by the conveyor 26 through the system 10. As the seeds leave the outlet 24 of the hopper 20, the vibratory feed 25 singulates the seeds by spacing the seeds apart into a single row. The vibratory feed 25 then delivers the row of seeds to the conveyor 26 which carries the seeds into view of the cameras. The tracking sensor 33 registers each seed as it leaves the vibratory feed 25. Because the seeds travel along the flat, clear conveyor 26, clear image data may be acquired from both the top and bottom cameras. Additionally, the seeds remain in a known location and fixed orientation on the conveyor 26 which allows each seed to be tracked with a high level of accuracy by the precision encoder.

The seeds first pass through the focal view of the first hyperspectral reflectance camera 30 which acquires image data across the visible light spectrum. An encoder reading may also be recorded as the seed is imaged by the first hyperspectral reflectance camera 30 to track the position of the seed on the conveyor 26. Next, the seeds pass through the focal view of the second hyperspectral reflectance camera 32 which acquires image data across the near-infrared spectrum. An encoder reading may also be recorded as the seed is imaged by the second hyperspectral reflectance camera 32 to track the position of the seed on the conveyor 26.

Next, the seeds pass through the focal view of the bottom 2D camera 36. The bottom 2D camera 36 acquires a 2-dimensional image of each seed which is processed by the controller 18 to produce length and width data for each seed. In one embodiment, the value associated with a maximum length and width measurements are recorded as the length and width values for the seed. An encoder reading may also be recorded as the seed is imaged by the bottom 2D camera 36 to track the position of the seed on the conveyor 26. Shortly thereafter, the seeds pass under the focal view of the top 2D camera. 34. The top 2D camera 34 acquires a 2-dimensional image of each seed which is processed by the controller 18 to produce length and width data for each seed. In one embodiment, the values associated with a maximum length and width measurement are recorded as the length and width values for the seed. An encoder reading may also be recorded as the seed is imaged by the top 2D camera 34 to track the position of the seed on the conveyor 26. As explained above, in a preferred embodiment, the seeds may pass through the focal view of a 2D camera 34 before passing though the focal view of the hyperspectral reflectance cameras 30, 32.

Next, the seeds pass through the passage 41 in the enclosure 39 and into the opening 43 under the view of the X-ray camera 38 which takes an X-ray of the seeds. The X-ray camera 38 acquires an image of the internal construction of each seed which is processed by the controller 18. An encoder reading may be recorded as the seed is imaged by the X-ray camera 38 to track the position of the seed on the conveyor 26. Finally, the seeds pass under the focal view of the 3D camera 40. The 3D camera 40 acquires a 3-dimensional image of each seed which is processed by the controller 18 to produce thickness data for each seed. An encoder reading may also be recorded as the seed is imaged by the 3D camera 40 to track the position of the seed on the conveyor 26. It is understood that the order of the instruments is not limited to the embodiments described herein.

Once a seed reaches the end of the conveyor 26, the seeds are captured by the collection mechanism 50 of the weighing assembly 15 which then delivers the seeds individually to the scale 52 for weighing. After the seeds are weighed, the transport mechanism 54 may transport the seeds to the storage assembly 16 where the seed collector 60 individually places the seeds into a microplate 64. Within the microplates 64 the seeds are allowed to grow. The data acquired for each seed is linked to the microplate 64 to which the seed is stored. Thus, the seed can be later analyzed referencing the image data acquired by the system 10 for making various determinations and correlations between seed quality and the associated seed image data. Alternatively, the seeds can be transferred to other trays, tubes, etc. for quality assessment while still maintaining each seed's identity. In one embodiment, the transport mechanism 54 deposits the seeds directly onto growth media.

The information obtained using the imaging and analysis assembly 14 can be useful in the subsequent processing, assessment, or analysis of the seeds. Generally, an attempt is made to correlate the color, mean, and variation in spectrum, size, shape, texture, and internal composition information for the seeds with quality attributes, including germination. These correlations suggest preferred imaging techniques on an application-specific basis. For example, in seed production plants, the data generated by the system 10 can be used to predict an overall distribution of defective seeds in a seed inventory, and to determine the distribution of defective seeds of a sub sample of seeds which can then be extrapolated to predict the overall seed inventory status. This distribution information may also be used to estimate seed quantities by commercial size categories and adjust sizing thresholds slightly in cases where seed quantities are limited.

In addition to the above description, other embodiments may include a bottom NIR hyperspectral camera, and an NIR backlight using polarized light. Further the X-ray enclosure may also consist of an inner and outer enclosure, where the inner enclosure is intended to block the majority of X-rays from the X-ray source and prevent X-ray interference or damage to the other imaging equipment, while the outer X-ray enclosure is intended to prevent any remaining X-rays from leaving the enclosure in conformance with the presence of a human operator.

EXAMPLES

Example 1

Figure 11:
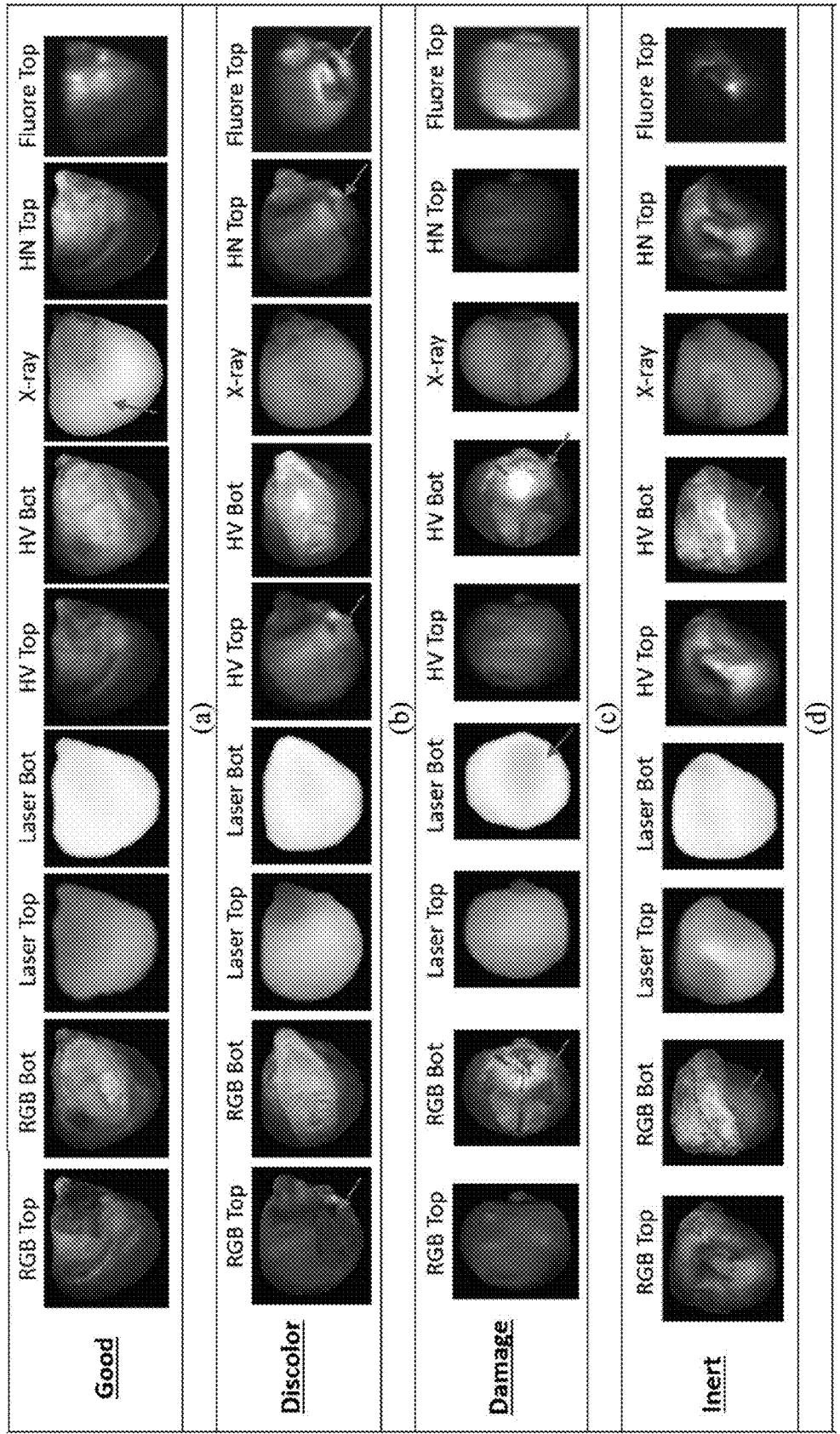
FIG. 11 relates to exemplary data from a seed imaging system.

Use of the seed imager shown in FIG. 10. FIG. 11 shows the spatially-aligned multimodal images of four types of corn seeds, including good, discolor, damage, and inert seeds, each of which is identified by a trained human inspector. First, the good seed presents no damaged structure, no abnormal color, and no disease from the external surface point of view. However, the X-ray imaging has captured the internal crack damage across the endosperm and embryo, affecting the physiological potential of the seed. Second, the discolor seed presents dark spots on surface which can be seen by various optical cameras, but not X-ray. Third and fourth, the damage and inert can occur in only local area, meaning that nothing abnormal is shown from top (or bottom) view. Therefore, the combination of top and bottom cameras is necessary to capture defects from a quasi-360 degree viewing range. Overall, this multimodal imager invention allows to capture external appearance, internal structure, three-dimensional geometry, and wide range of spectrum information. The necessity of such data fusion in seed quality measurement can hence be demonstrated.

Example 2

A method of using embodiments of the invention for the purpose of making breeding determinations.

Example 3

A method of using the data toward single seed correlation for imaging data to quality metrics, including correlating pixel to class of defect.

Example 4

A method of using the output data for big data and potentially machine learning.

Example 5

A method of using embodiments of the invention in combination with other seed categorization systems. e.g., genotyping, single seed identity coming into system, e.g. HD trays from seed chipper, and identity maintained during process.

Example 6

Embodiments where each of the imaging systems are used in-part, as where they are not used in a single sequential machine, but are separated and the system provides for placement of the seeds in such a way that they do not move from their location for imagery purposes. Further, this would also include embodiments where the imagery systems are used in different sequential order. For example, particular applications use different groupings of imaging options. Seed identity/orientation are maintained.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A seed imaging system for imaging seeds, the system comprising:
   a seed transfer station configured to move seeds through the system, the seed transfer station including a conveyor belt, wherein the seed transfer station is configured to substantially fix a position and/or orientation of each of the seeds on the conveyor belt as the seeds move through the system;
   a tracking sensor configured to register the position and/or orientation of each of the seeds on the conveyor belt;
   an imaging assembly comprising:
      at least one first camera mounted relative to the conveyor belt of the seed transfer station and configured to acquire 2D images of the seeds as the seeds move through the system;
      at least one second camera mounted relative to the conveyor belt of the seed transfer station and configured to acquire 3D images of the seeds as the seeds move through the system;
      at least one third camera mounted relative to the conveyor belt of the seed transfer station and configured to acquire X-ray images of the seeds as the seeds move through the system; and
      at least one fourth camera mounted relative to the conveyor belt of the seed transfer station and configured to acquire hyperspectral images of the seeds as the seeds move through the system;
   wherein the 2D images, the 3D images, the X-ray images, and the hyperspectral images include images of each of the seeds in the substantially fixed position and/or orientation on the conveyor belt; and
   a controller configured to: (i) align the 2D images, the 3D images, the X-ray images, and the hyperspectral images acquired for each of the seeds based, at least in part, on the substantially fixed position and/or orientation of each of the seeds registered by the tracking sensor and (ii) analyze the aligned images of the seeds for one or more characteristics.

2. The seed imaging system of claim 1, wherein the conveyor belt is one of transparent or semi-transparent.

3. The seed imaging system of claim 1, further comprising a weighing assembly located at an end of the conveyor belt of the seed transfer station and configured to weigh the seeds individually;
   wherein the weighing assembly includes:
      a funnel configured to receive the seeds from the end of the conveyor belt;
      a scale disposed adjacent an outlet of the funnel, the scale configured to receive an individual one of the seeds from the funnel and weigh the individual seed; and
      a transport mechanism configured to transport the weighed seed away from the scale.

4. The seed imaging system of claim 1, further comprising a storage assembly configured to automatically store the seeds into separate storage containers based on the analysis of the images of the seeds by the controller.

5. A method of imaging seeds, the method comprising:
   aligning individual seeds in at least one row at a seed loading assembly;
   delivering the individual seeds, in the at least one row, from the seed loading assembly to a conveyor belt of a seed transfer station;
   registering, via a tracking sensor, a position and/or orientation of each of the individual seeds delivered to the conveyor belt;
   moving the seeds through a seed imaging system, in the at least one row, using the conveyor belt of the seed transfer station, wherein a position and/or orientation of each of the seeds is substantially fixed on the conveyor belt as the seeds move past a first camera and a second camera of the seed imaging system;
   acquiring, using the first camera mounted relative to the conveyor belt of the seed transfer station, images of the seeds as the seeds move through the system via the conveyor belt;
   acquiring, using the second camera mounted relative to the conveyor belt of the seed transfer station, images of the seeds as the seeds move through the system via the conveyor belt, an imaging technology of the second camera being different from an imaging technology of the first camera; and
   aligning, by a controller, the images of the seeds from the first camera and the images of the seeds from the second camera based, at least in part, on the registered position and/or orientation of each of the seeds.

6. The method of claim 5, further comprising analyzing the aligned images using the controller.

7. The method of claim 5, further comprising acquiring, using a third camera mounted relative to the conveyor belt of the seed transfer station, images of the seeds as the seeds move through the system via the conveyor belt, an imaging technology of the third camera being different from the imaging technology of each of the first and second cameras.

8. The method of claim 7, further comprising acquiring, using a fourth camera mounted relative to the conveyor belt of the seed transfer station, images of the seeds as the seeds move through the system via the conveyor belt, an imaging technology of the fourth camera being different from the imaging technology of each of the first, second, and third cameras.

9. The method of claim 5, wherein the imaging technology of the first camera is one of 2D imaging, 3D imaging, X-ray imaging, and hyperspectral imaging; and
wherein the imaging technology of the second camera is a different one of 2D imaging, 3D imaging, X-ray imaging, and hyperspectral imaging.

10. The method of claim 5, further comprising:
receiving individual ones of the seeds, from the conveyor belt of the seed transfer station, on a scale of a weighing assembly;
weighing the individual seeds received on the scale of the weighing assembly; and then
transporting the individual weighed seeds from the scale to a storage assembly.

11. The method of claim 5, further comprising storing the seeds using a storage assembly.

12. The method of claim 11, wherein storing the seeds comprising storing the seeds individually in microplates.

13. A seed imaging system for imaging seeds, the system comprising:
a seed transfer station configured to move seeds through the system;
a seed loading station configured to deliver the seeds to the seed transfer station;
a tracking sensor disposed at the seed loading station, the tracking sensor configured to register a position and/or orientation of each of the seeds delivered to the seed transfer station; and
an imaging assembly comprising a first camera mounted above the seed transfer station and configured to acquire images of the seeds as the seeds move through the system, and a second camera mounted below the seed transfer station and configured to acquire images of the seeds as the seeds move through the system;
wherein the transfer station is configured to substantially fix the position and/or orientation of the seeds in the seed transfer station as the seeds move past at least the first and second cameras.

14. The seed imaging system of claim 13, wherein the first and second cameras have the same imaging modality.

15. The seed imaging system of claim 14, wherein the imaging modality of the first and second cameras is one of 2D imaging, 3D imaging, X-ray imaging, and hyperspectral imaging.

16. A seed imaging system for imaging seeds, the system comprising:
a seed loading station configured to align seeds in at least one row;
a seed transfer station configured to receive the aligned seeds from the seed loading station and move the aligned seeds, in the at least one row, through the system;
a tracking sensor disposed at the seed loading station, the tracking sensor configured to register a position and/or orientation of the aligned seeds received at the seed transfer station; and
an imaging assembly comprising a first camera configured to acquire images of the seeds as the seeds move through the system based on a first imaging technology, and a second camera configured to acquire images of the seeds as the seeds move through the system based on a second imaging technology different from the first imaging technology of the first camera.

17. The seed imaging system of claim 16, wherein the seed loading station includes at least one vibratory channel configured to arrange the seeds in the at least one row.

18. The seed imaging system of claim 1, wherein the one or more characteristics include at least one of color, size, shape, texture, internal composition, mass, volume, moisture content, and chemical composition.

19. The seed imaging system of claim 1, further comprising a seed collector configured to receive the seeds from the conveyor belt and position the seeds in one or more storage containers;
wherein the controller is configured to associate the one or more characteristics of the seeds with the one or more storage containers in which the seeds are positioned.

20. The seed imaging system of claim 1, further comprising multiple storage containers each configured to receive at least one of the seeds.

21. The seed imaging system of claim 20, wherein each of the multiple storage containers includes a growth media configured to facilitate growth of the at least one of the seeds received in said storage container.

* * * * *